United States Patent [19]

Newman

[11] Patent Number: 5,249,082
[45] Date of Patent: Sep. 28, 1993

[54] EXACT CONSTRAINT ARRANGEMENT FOR AND METHODS OF MOUNTING AN ELEMENT SUCH AS A LENS

[75] Inventor: Peter A. Newman, Rochester, N.Y.
[73] Assignee: Eastman Kodak Company, Rochester, N.Y.
[21] Appl. No.: 697,362
[22] Filed: May 8, 1991
[51] Int. Cl.⁵ .............................................. G02B 7/02
[52] U.S. Cl. ................................. 359/813; 359/819; 359/827
[58] Field of Search ............................ 359/808–830, 359/896, 900; 29/434–437

[56] References Cited

U.S. PATENT DOCUMENTS

| | | | |
|---|---|---|---|
| 3,671,108 | 6/1972 | Kilgus | 359/820 |
| 4,076,393 | 2/1978 | Bates | 359/820 |
| 4,733,945 | 3/1988 | Bacich | 359/820 |

FOREIGN PATENT DOCUMENTS

| | | | |
|---|---|---|---|
| 31151 | 7/1981 | European Pat. Off. | 359/827 |
| 221566 | 4/1985 | Fed. Rep. of Germany | 359/820 |
| 202414 | 11/1984 | Japan | 359/808 |
| 139507 | 6/1987 | Japan | 359/819 |
| 167708 | 7/1989 | Japan | 359/819 |

Primary Examiner—Ronald J. Stern
Assistant Examiner—Thong Nguyen
Attorney, Agent, or Firm—Millen, White, Zelano & Branigan

[57] ABSTRACT

An element, such as a lens, is mounted on an element holder, such as a lens holder, so as to be constrained with a clearance-free, exact centering fit. The element has three radial faces spaced 120° apart with respect to the center of the element, and the element holder has three abutments spaced 120° apart with respect to a center point about which the abutments are distributed. Upon seating the element in the element holder with the radial faces and abutments in engagement, the element is constrained with the center points of the element and element holder in alignment. The radial faces and abutments are held in engagement by a retainer which also holds the element on the element holder. In accordance with one embodiment of the invention, the element is a plastic lens, and the element holder is a lens barrel, the lens being retained with clearance within the lens barrel by a retaining ring. Since the lens is engaged radially, rather than peripherally, the lens is free to expand and contract radially within the barrel.

35 Claims, 14 Drawing Sheets

EXACT CONSTRAINT ARRANGEMENT FOR AND METHODS OF MOUNTING AN ELEMENT SUCH AS A LENS

TECHNICAL FIELD

This invention relates to an exact constraint arrangement for and methods of mounting an element. More particularly, this invention relates to an exact constraint arrangement for and methods of mounting elements such as lenses.

Background Art

It is frequently necessary to mechanically mount elements with precision. This is especially the case with optical elements, such as lenses, which must be precisely aligned. Lenses such as zoom lenses must be mounted in supporting barrels so as to accurately align with the optical axis of a camera. Zoom lenses have extremely tight tolerances with respect to tilt and decentralization, and it has long been a problem to achieve precise alignment. Even when precise alignment is initially achieved, it may be difficult to maintain alignment with temperature changes which cause slight expansions and contractions in a lens or the barrel in which the lens is mounted. If temperature changes cause the lens to expand and contract and the lens is restrained at close tolerances, the lens may change shape slightly and inappropriately distort images it transmits. Accordingly, achieving precise alignment initially is at odds with providing clearances necessary to accommodate temperature fluctuations.

Prior art approaches take this dichotomy into account and rely on barrel clearance to accommodate changes in temperature and to facilitate assembly. Generally, lenses such as zoom lenses are mounted in barrels by aligning the optical axis of the lens with the central axis of the barrel and inserting the lens into the barrel. Since the lens diameter must be nominally less than the barrel diameter in order to leave clearance that will allow assembly, and since each diameter has a tolerance around it so that the actual clearance can vary depending on part tolerance, there is the substantial chance that the lens will not be centered upon being mounted in the barrel.

The patent literature includes numerous approaches for mounting elements such as lenses in structures such as barrels; however, each of these approaches has deficiencies.

U.S. Pat. No. 4,738,512 to Faatz et al. discloses a locking mount wherein the lens is locked in place with a self-locking connection. Faatz et al. utilizes rigid positioning of the lens which induces mounting stress as well as subjects the lens to thermal stress. In addition, the arrangement is vulnerable to the effects of humidity.

Soviet Union Patent Document 1,254,399 discloses an astronomy instrumentation lens holder in which three supports on the lens and holder are designed to slip with changes in temperature without displacing the center of the lens. The approach of the Soviet publication, while allowing for thermal expansion of radial faces, requires the use of counterbalancing elements and is not suitable for devices such as zoom lens mounts for cameras.

U.S. Pat. No. 4,778,252 to Filho utilizes a spring biasing means to center an object in a barrel. In Filho, the axial position can vary, depending on the spring variation of the supporting springs, wherein a force balance is used to position the lens rather than a positive or rigid connection.

U.S. Pat. No. 2,937,571 utilizes a plurality of bias points within a barrel to center a lens. In Thompson, the alignment is active because adjustment screws are provided to create the proper force balance on the lens to properly center the lens.

A further example of force balance or resilient alignment occurs in U.S. Pat. No. 4,812,015 to Iizuka et al. wherein a resilient barrel is provided to retain a lens. Again, the connection is not positive but relies on spring force to achieve centering.

Generally, the patent literature suggests solving the problem of mounting lenses for initial and continued precise alignment by relying on force balance, active alignment, or positive locking. Each of these approaches has deficiencies. Accordingly, there is a need for an arrangement for and methods of mounting elements such as lenses in supports, such as barrels, which minimize the drawbacks introduced by arrangements taught by the prior art.

SUMMARY OF THE INVENTION

It is an object of the instant invention to provide an arrangement for and methods of mounting elements such as lenses in supports such as lens barrels, wherein a rigid connection between element and support is achieved in combination with passive alignment and non-locking retention so as to avoid: (1) inaccuracies introduced by force balance, (2) complications caused by active alignment prior to securing the element, and (3) distortions induced by thermal and mechanical stress caused by locking the element positively in position.

Upon further study of the specification and appended claims, further objects and advantages of this invention will become apparent to those skilled in the art.

In view of the aforementioned and other objects, the instant invention contemplates an arrangement for mounting an element with a clearance-free and exact centering fit, the arrangement utilizing the element and element holder as components, with one of the components having three spaced abutments and the other component having three radially extending faces. The abutments and faces are arranged in such a manner that when one of the components is placed in juxtaposition with the other component and rotated about instant centers occurring as the radial faces engage abutments, the components become positively engaged. When the three radial faces abut the three abutments, a predetermined point defined on the element aligns with a predetermined point defined with respect to the element holder.

In accordance with one aspect of the invention, the element holder accepts the element in only one angular orientation of the element with respect to the element holder and with only one side of the element facing the element holder.

In accordance with another aspect of the invention, the radial faces of the element are equiangularly disposed proximate equiangular areas of clearance, with the projections of the holder being arranged at the apexes of an equilateral triangle, wherein the element holder accepts and aligns the element with a clearance-free, exactcentering fit regardless of which projection abuts which radial face.

In accordance with a more limited embodiment of the invention, the element holder is cylindrical, and the element itself is generally circular. The center on the element is the point through which radii of the three radial faces emanate, and the point predetermined with respect to the cylinder is the central axis of the cylinder.

In accordance with a selected embodiment of the invention, the element being mounted is a lens and the element holder is a lens barrel, the arrangement further including structure to automatically seat the radial faces of the lens against the radial projects of the barrel upon securing the lens within the barrel by applying an axial force to the lens.

In a further embodiment of the instant invention, as the instant invention applies to mounting lenses, a plurality of lenses are mounted within a barrel, each of which is positioned by a lens retainer which automatically centers the lenses upon being applied axially with respect to the central axis of the barrel and optical axes of the lenses.

DESCRIPTION OF THE PREFERRED EMBODIMENTS

Figure 1:
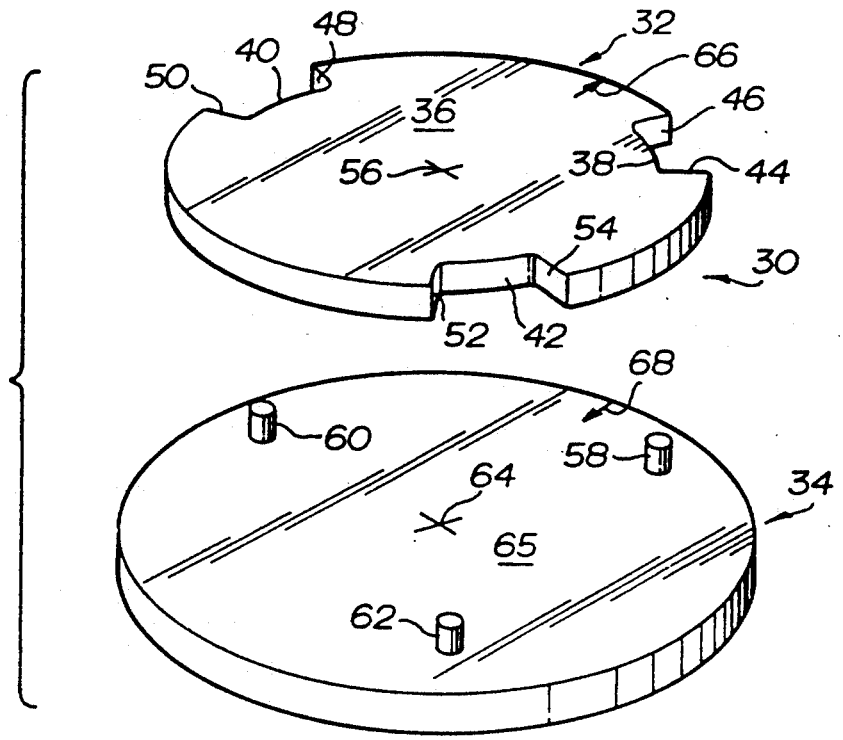
FIG. 1 is a perspective view showing an element with at least three radial faces and an element holder with at least three projections comprising an arrangement in accordance with the principles of the instant invention.

Referring now to FIG. 1, there is shown an arrangement, designated generally by the numeral 30, in which an element, designated generally by the numeral 32, is mounted on an element holder, designated generally by the numeral 34. In the illustrated embodiment, the element 32 is configured as a disc 36 having first, second, and third peripheral notches 38, 40, 42. The notch 38 has faces 44 and 46, the notch 40 has faces 48 and 50, and the notch 42 has faces 52 and 54. Each of the faces 46 50, and 52 are radial faces aligned with a radius of the disc 36 so as to align with a central point 56. While the faces 44, 48, and 54 appear to be radial in FIGS. 1-4, it is not at all necessary for these faces to be radial, since they do not contact the pins but rather define the width of the slot. It is emphasized here that the disc 36 may be an element such as the lens of an optical instrument, e.g., a camera, or the element 32 may be any other element which one wishes to mount on the element holder 34 in practice of the principles of the instant invention.

The element holder 34 has three radially positioned, spaced projections or pins 58, 60, and 62 spaced with respect to a central point 64. In the illustrated embodiment, the contact points of the pins 58, 60, and 62 are at the apexes of an equilateral triangle, the center of which is the point 64. In accordance of the instant invention, the central element 32 is placed upon the element holder 34 so that the element fits flat against the surface 65 of the element holder with the pins 58, 60, and 62 received in the notches 38, 40, and 42 so that the three radial faces 46, 50, and 52 of the element are proximate projections 58, 60, and 62 on the element holder 34.

In the embodiment of FIGS. 1-4, this initial orientation can only be accomplished if the element 32 and element holder 34 are initially properly oriented with respect to one another. In order to accomplish this initial orientation, the element 32 has first indicia in the form of an arrow 66 placed thereon and the element holder 34 has second indicia in the form of an arrow 68 mounted thereon.

Figure 2:
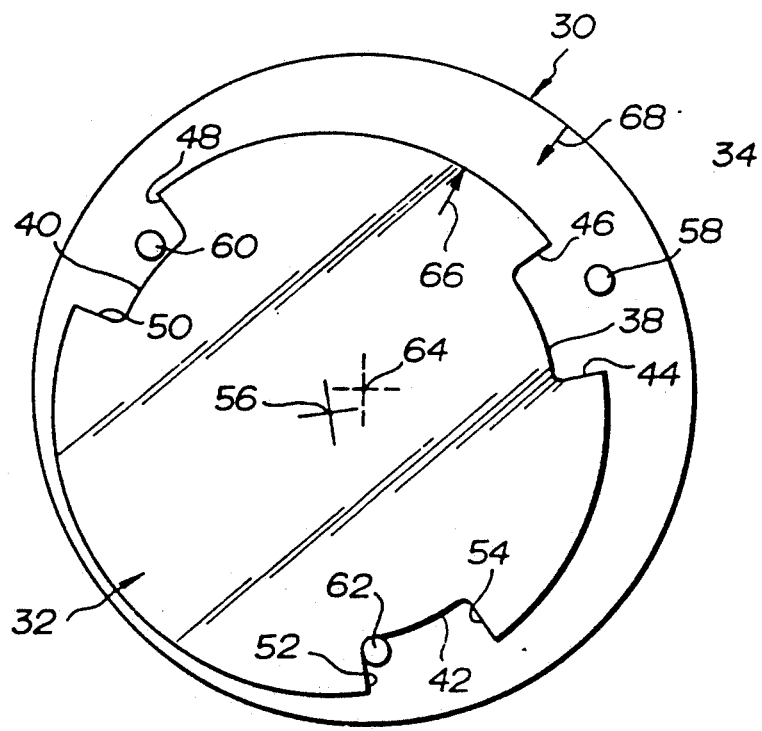
FIG. 2 is a top view of the element and element holder of FIG. 1 showing a single radial face on the 0 element abutting a single projection on the element holder to create a first instant center at the point of abutment.

As is seen in FIG. 2, when the element 32 is mounted flush against the element holder 34 so that the pins 58, 60, and 62 are generally aligned with the notches 38, 40, and 42, the arrows 66 and 68 will be in proximity with one another. In the embodiment of FIGS. 1-4, there is only one angular orientation in which alignment is possible because while the radial faces 46, 50, and 52 are equally spaced 120° apart, the notches 38, 40, and 42 are not spaced equally 120° apart. This is readily apparent from FIG. 4, wherein the pin 62 abuts radial face 52 rather than face 54 so that the notch 42 extends in the opposite direction from the pin 62 than the notches 38 and 40 extend from pins 58 and 60, respectively. Consequently, there is only one acceptable angular orientation of the element 32 with respect to the element holder 34. Moreover, if the element 32 is flipped upside down and the first and second arrows 66 and 68 are aligned, it will be impossible to achieve the arrangement of FIG. 2, where the element 32 is flush against the element holder since at least one of the two radially disposed projections 58, 60, and 62 on the base 34 will not align with a notch 38, 40, and 42 in the element 32. Thus, the arrangement of FIGS. 1-4 provides a method of properly orienting elements.

Figure 3:
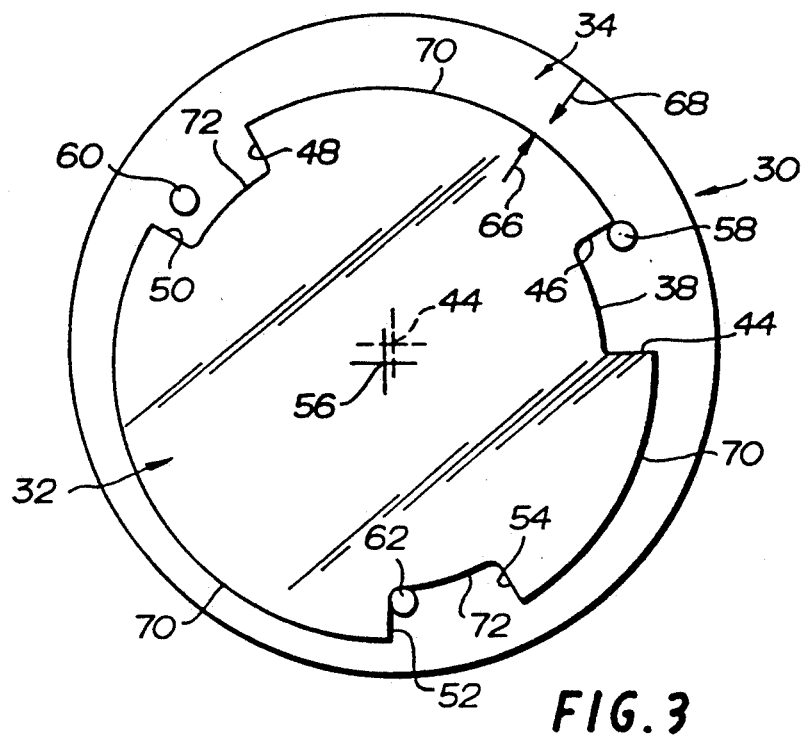
FIG. 3 is a view similar to FIG. 2 but showing two radial faces on the element abutting two projections on the holder after having been rotated about the first instant center to create a second instant center.
Figure 4:
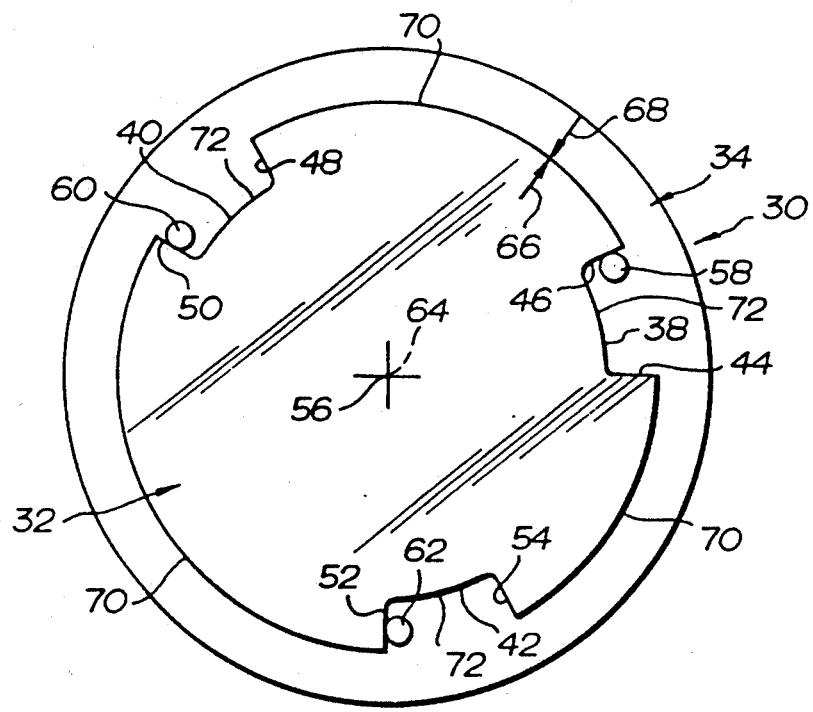
FIG. 4 is a view similar to FIGS. 2 and 3 showing three radial faces on the element engaging the three projections on the element holder after having been rotated about the second instant center so as to align center points of the element and the element holder.

Referring now more specifically to FIGS. 2, 3, and 4, it is seen in FIG. 2 that the projection 62 initially abuts radial surface 52 on the element 32 to provide a single abutment. However, either of the other two projections 58 or 60 could provide the single abutment. As is seen in FIG. 3, upon slidably and rotatably adjusting the element 32 while keeping projection 62 in engagement with radial surface 52, projection 58 comes into abutment with radial surface 46. Again, projection 60 could just as easily brought into engagement with radial surface 50 to provide two points of abutment. Upon adjusting the element 32 again, while holding radial face 52 in engagement with projection 62 and radial face 46 in engagement with projection 58, until radial face 50 abuts projection 60, the central point 56 on the element 32 and central point 64 on element holder 34 coincide. As long as there is abutment between the projections 58, 60, and 62 and the radial faces 46, 50, and 52, respectively, the element 32 will be constrained from further movement and the central points 56 and 64 will align. By controlling the width of the notches 38, 40, and 42 and spacing the notches at angles other than 120° with respect to one another, it is possible to provide for not only centering of the element 32 with respect to the element holder 34, but also to provide for a selected angular orientation of the element and element holder, as well as selecting whether the upper or lower face of the element will engage the surface of the element holder.

As is seen in FIG. 4, radial constraint of the element 32 is not achieved by having a fixed surface on the element holder 34 engaging peripheral portions such as the portions 70 and 72 of the element. Consequently, the element 32 is substantially free to expand in the radial direction without forces being exerted thereon which might distort the element. Accordingly, the element 32 can accommodate thermal and humidity expansion and contraction with minimal distortion.

If the slots 38, 40, and 42, as well as the radial faces 46, 50, and 52, are oriented at 120 with respect to one another instead of being at different angles, as is seen in FIGS. 1-4, the arrangement serves only to center the element 32 with respect to the element holder 34, neutralizing both rotational orientation and flip-side orientation. This is because regardless of which notch 38, 40, and 42 aligns with which pin 58, 60, and 62, the element 32 will align its center point 56 with the center point 64 of the element holder 34 as long as any three of the projections engage any three of the radial surfaces. The special case of spacing the notches 38, 40, and 42 (or the equivalent of the notches) may be useful in accordance with the principles of the instant invention in configuring lens mounting arrangements where angular orientation is not a factor, as will be more fully explained hereinafter.

Figure 5:
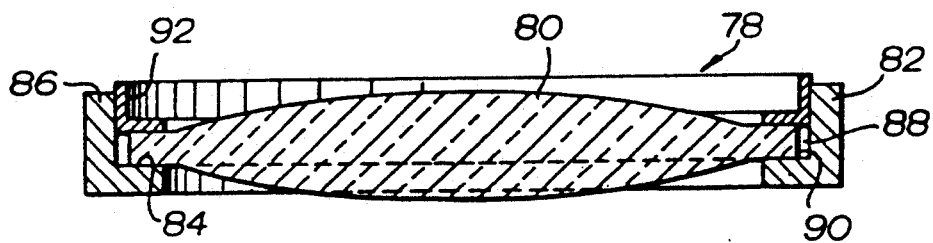
FIG. 5 is a side elevation illustrating generally prior art arrangements for mounting lenses in lens barrels.

Prior Art Lens Element Mounting Arrangements - FIG. 5

Referring now to FIG. 5, there is shown a prior art arrangement, designated generally by the numeral 78, for mounting a lens element 80 in a barrel 82. The lens element 80 may be one of a set of lens elements in a zoom lens for a camera (not shown) or a lens for another optical instrument. As is seen in FIG. 5, the lens 80 rests on an annular shoulder 84, which projects inwardly from a rim portion 86 of the barrel 82. In order to allow assembly, there is a space 88 between the periphery 90 of the lens 80 and the inner wall of the rim portion 86. A retaining ring 92, which is L-shaped in cross section, bears against both the lens 80 and the rim portion 86 of the barrel 82 to retain the lens in place. Since the diameter of the rim portion 86 of the barrel 82 and that of the lens 80 have tolerances of their own, the actual clearance 88 will vary, depending on the part tolerance. The result is that the lens 80 frequently does not center in the barrel 82.

First Embodiment of Lens Mounting Arrangement - FIGS. 6-9

Figure 6:
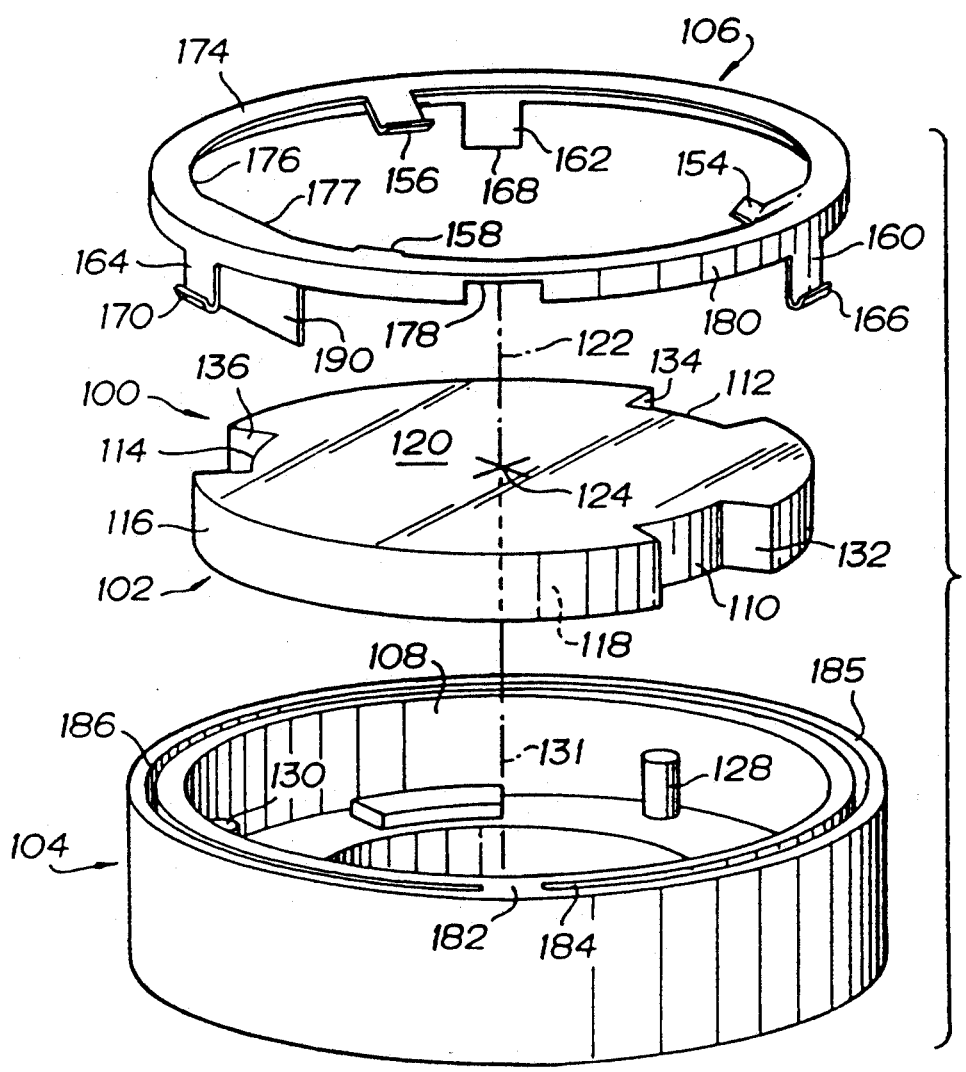
FIG. 6 is a perspective view of a first embodiment of a lens mounting arrangement employing the principles of FIGS. 1-4 to mount a lens within a lens barrel.

Referring now to FIG. 6, there is shown an exploded view of a lens mounting arrangement, designated generally by the numeral 100, which utilizes the principles of FIGS. 1-4 to mount a lens, designated generally by the numeral 102, in a cylindrical lens holder in the form of a barrel, designated generally by the numeral 104. The lens 102 is held in position by a retaining ring, designated generally by the numeral 106, which fits within the interior portion 108 of the barrel 104 to retain the lens 102 in position.

The lens 102 has notches 110, 112, and 114 in the circular periphery 116 thereof. In the illustrated embodiment, it is important that the lens 102 be mounted so that a front surface 118 faces out of the barrel and a rear surface 120 faces into the barrel so that the lens focuses properly. In other words, it is important that the lens 102 be oriented in the right direction since it is asymmetrical in cross section. While the three notches 110, 112, and 114 are disposed radially with respect to the optical axis 122 of the lens 102 which passes through the center 124 of the lens, the spacing of the notches is not equiangular. In other words, the notches are not spaced 120° apart. As was explained in the embodiment of FIGS. 1-4, by not having the notches 110, 114, and 116 equiangular, the lens 102 can assume only one position when mounted in the barrel 104 if the contact points of the radially spaced projections with which the notches cooperate are equidistant and equiangularly positioned with respect to the central axis of the barrel 104.

Figure 7:
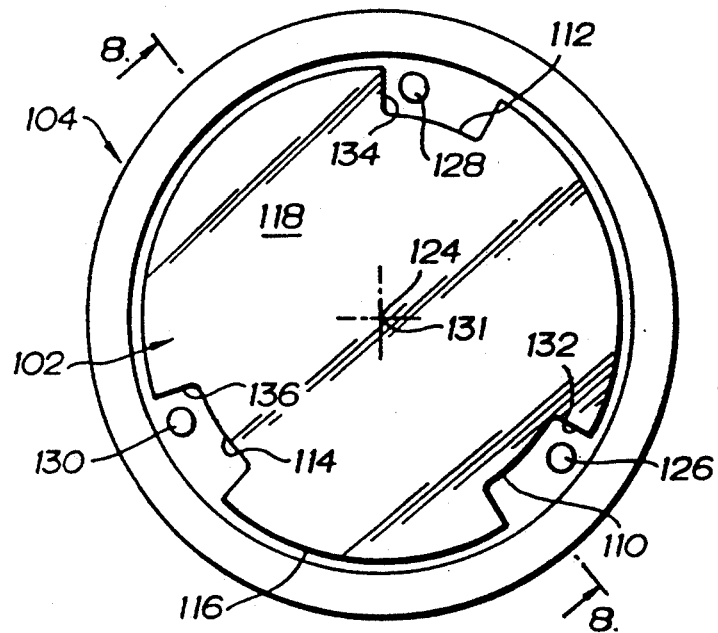
FIG. 7 is a top view of the lens mounting arrangement of FIG. 6 showing the lens positioned within the lens barrel prior to insertion of a retaining ring.

As is seen in FIG. 7, the barrel 104 includes three axially extending radially disposed projections or pins 126, 128, and 130, which are received in slots 110, 112, and 114, respectively, of lens 102. The pins 126, 128, and 130 are equiangularly spaced with respect to the central axis 131 of the barrel 104. When the lens 102 is angularly oriented properly, with the front surface 118 facing outwardly for engagement by the retaining ring 106, the pins register with their respective slots. If the lens 102 is improperly mounted, with the lens surface 120 facing inwardly the pins 126, 128, and 130 will not all align with a slot and will not allow the lens to bottom so as to properly seat within the interior 108 of the barrel 104. As is seen in FIG. 7, when the lens 102 is properly positioned initially, the pin 126 will be proximate radial face 132 of notch 110; the pin 128 will be proximate radial face 134 of slot 112, and the pin 130 will be proximate the radial face 136 of slot 114. The pins 126, 128, and 130 will not necessarily abut the radial faces 132–136 upon inserting the lens 102 into the barrel 104 but will be positioned so that upon shifting the lens 102, abutment will occur.

Figure 8:
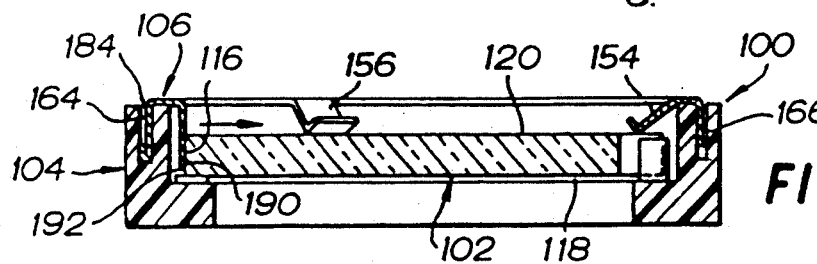
FIG. 8 is a side elevation taken along lines 8—8 of FIG. 7 after the first lens embodiment of FIG. 6 has been assembled.
Figure 9:
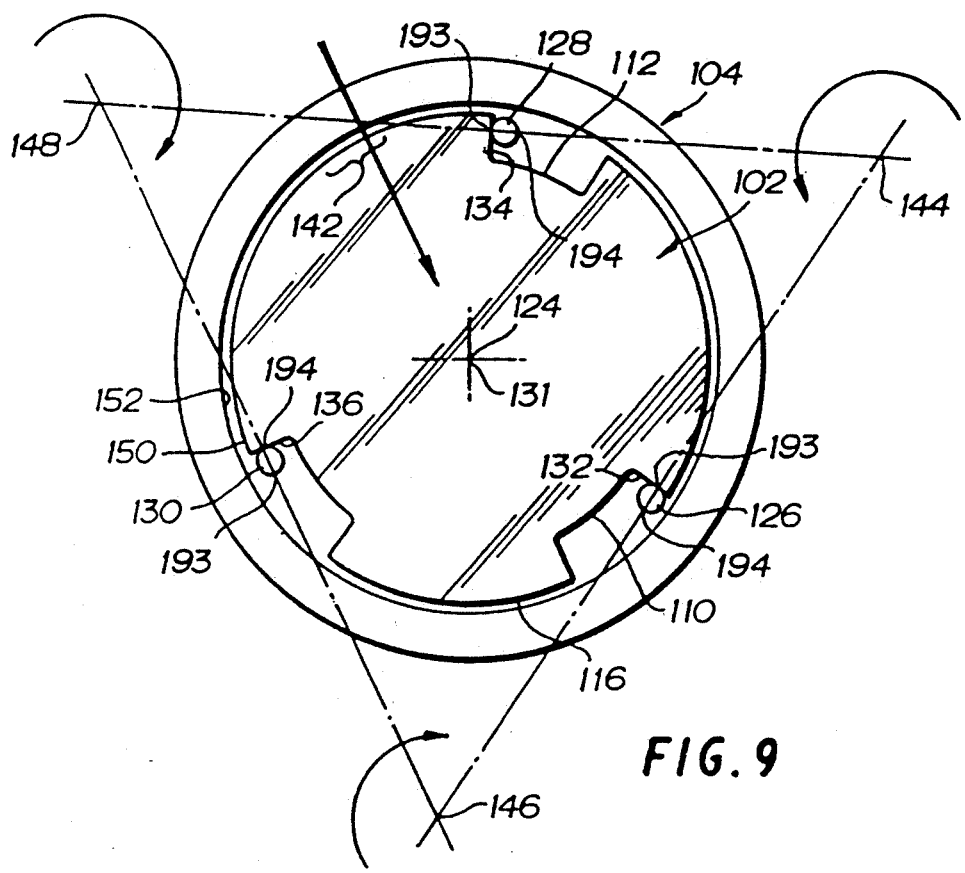
FIG. 9 is a top view of the assembled arrangement of FIG. 8 showing how the retaining ring urges the optical axis of the lens into alignment with the axis of the lens barrel by rotating the lens about instant centers as the retaining ring is axially inserted into the barrel.

Referring now to FIGS. 8 and 9, it is seen that the shift to accomplish abutment occurs upon inserting the retaining ring 106 into the interior 108 of the barrel 104. The retaining ring 106 has a tab 140 thereon which engages the periphery 116 of the lens 102 at a location proximate area 142 on the lens as the retaining ring 106 is pushed axially into the barrel 104, the lens 102 slides and rotates about instant centers 144, 146, and 148 as these instant centers are created by abutment of the radial faces 132, 134, and 136 with pins 126, 128, and 130. Upon all three abutments occurring, the center 124 of the lens, which corresponds to the optical axis of the lens, aligns with the axis 131 of the barrel 104. As is best seen in FIG. 9, there is a space 150 between the periphery of the lens 102 and the inner wall 152 of the barrel which allows for thermal expansion of the lens and permits rapid initial assembly.

As is best seen in FIG. 8 (and FIG. 6), the ring 106 applies axial pressure to the lens 102 by engagement of resilient tangs 154, 156, and 158 with the upper surface 118 of the lens. The retaining ring 106 also includes J-shaped peripheral prongs 160, 162, and 164 which have hook portions 166, 168, and 170 that frictionally engage with the barrel 104 to frictionally hold the annular retainer in place. The J-shaped prongs 160, 162, and 164 allow the retaining ring 106 to be easily inserted but difficult to remove and thus provide a substantially permanent structure for retaining the lens 102 in the barrel 104.

Since it is necessary to orient the annular retaining ring 106 in a specific angular orientation with respect to the pins 126, 128, and 130, as well as the notches 110, 112, and 114 of the lens 102, the retaining ring has a notch 178 in a peripheral rim portion 180. The notch 178 accommodates a rib 182 in the barrel 104, which rib is formed in a annular groove 184 positioned in the annular face 185 of the barrel 104. A single spring tab 190 depends from the inside edge 176 of the annular face flange 174 at location of a chord portion 177. When the retaining ring 106 is pushed against the lens 102 with the notch 178 aligned with rib 182, the prongs 160, 162, and 164 frictionally engage the inner wall 186 of the groove 184 and hold the retainer 106 in place. The spring tabs 154, 156, and 158 press axially against the outer surface 118 of the lens 102 and the single spring tab 190 presses against periphery 116 of the lens at location 192 to urge the radial faces 132, 134, and 136 into abutment with the pins 126, 128, and 130. In this way, the lens 102 is firmly seated and centered in the barrel 104.

Figure 10:
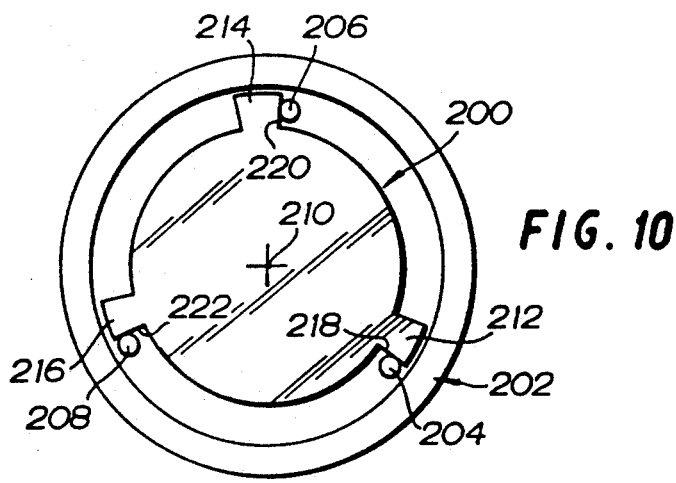
FIG. 10 is a view similar to FIGS. 7 and 9 but showing a second embodiment of the lens mounting arrangement, wherein the lens locates radial faces on tabs rather than within notches.

Second Embodiment of the Lens Mounting Arrangement - FIG. 10

As with the general embodiment of FIGS. 1-4, the embodiment of FIGS. 6-9 utilizes notches 110, 112 and 114 which are not equiangularly spaced in combination with pins 126, 128 and 130, which pins are equiangularly spaced. As is seen in FIG. 9, each pin has first surfaces 193 and second surfaces 194 facing away from the first surfaces with the first surfaces of pins 126 and 128 being in abutment with radial surfaces 132 and 134, respectively, and the second surface of pin 130 being in abutment with radial surface 130. By having this arrangement, the lens 102 can only seat in the barrel 104 with front surface 118 facing outwardly.

FIG. 10 is another embodiment of the arrangement of FIGS. 6–9, wherein a lens, designated generally by the numeral 200, is retained within a barrel, designated generally by the numeral 202. The barrel 202 has three pins 204, 206, and 208 having contact points which are spaced equiangularly about a center point 210. The lens 200 of FIG. 10 ditters from the lens 102 of FIG. 6 in that instead of having notches, such as the notches 110, 112, and 114 of FIGS. 6–9, tabs 212, 214, and 216 are utilized. The tabs 212, 214, and 216 have radial faces 218, 220, and 222 which are spaced 120° apart even though the tabs 212, 214, and 216 are not spaced 120° apart. Since the other possible abutment surfaces 224, 226, and 228 are not spaced 120° apart, it is impossible to achieve abutment with the pins 204, 206, and 208 unless the lens 200 is correctly angularly oriented with respect to the barrel 202.

In the embodiment of FIG. 10, the lens 200 can still seat in the barrel, with the tabs 212, 214, and 216 missing the pins 204, 206, and 208 since there is a considerable arcuate distance between the tabs. However, it will be apparent to the installer of the lens 200 that the lens can rotate a substantial amount within the barrel 204 in both directions before hitting one of the pins 204, 206, or 208 to indicate that the lens has not been properly oriented before being placed in the barrel. FIG. 10 highlights the advantage of the arrangement of FIGS. 6–9, wherein there is only one arcuate position of the lens which allows the lens to drop all the way home in the barrel without being abutted on its back surface 120° (or its front surface 118, for that matter) by the pins in the barrel.

Figure 11:
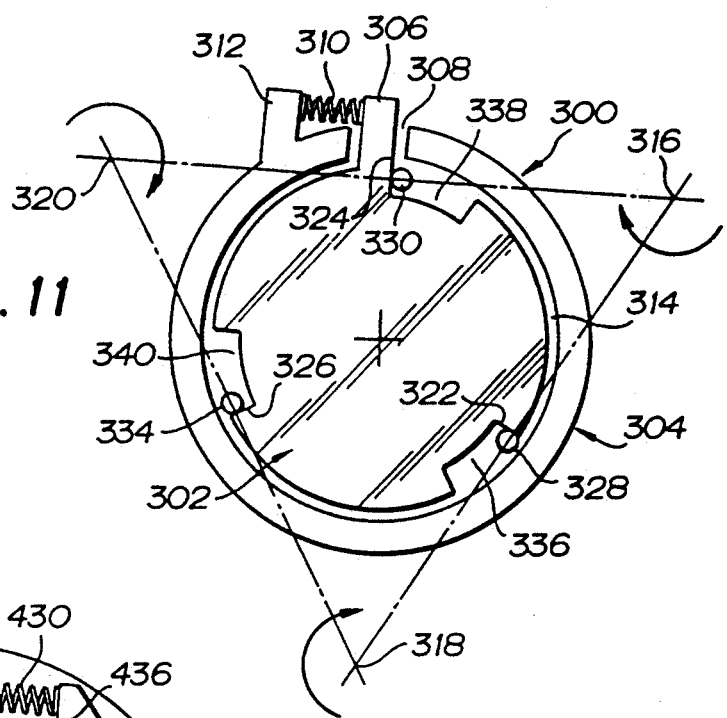
FIG. 11 is a top view similar to FIGS. 7 and 9 showing a third embodiment of the lens mounting arrangement, wherein a single spring is used to bias the radial faces of the lens into positive engagement with the radially positioned projections of the barrel.

Third Embodiment of the Invention - FIG. 11

Referring now to FIG. 11, a third arrangement of the invention, designated generally by the numeral 300, is illustrated wherein a lens, designated generally by the numeral 302, is retained within a barrel, designated generally by the numeral 304. In the arrangement of FIG. 11, the lens 302 has a projection 306 thereon which projects through an opening 308 in the wall of the barrel 304 so as to be engaged by spring means 310 which fits 10 between the projection 306 and an arm 312, projecting from the barrel 300. Since the lens 302 floats slightly within the barrel 304 due to clearance 314, the spring 310 will urge the lens 302 to rotate about two of the instant centers 316, 318, and 320 until the radial faces 322, 324, and 326 of the lens abut pins 328, 330, and 332 on the barrel.

The arrangement 300 differs from the arrangement of FIGS. 6-9 (and the arrangement of FIG. 10) in that the surfaces 326, 324, and 322 are spaced 120° apart, as are the notches 336, 338, and 340. Accordingly, the arrangement 300 is not an orienting arrangement, as well as a centering arrangement.

Figure 12:
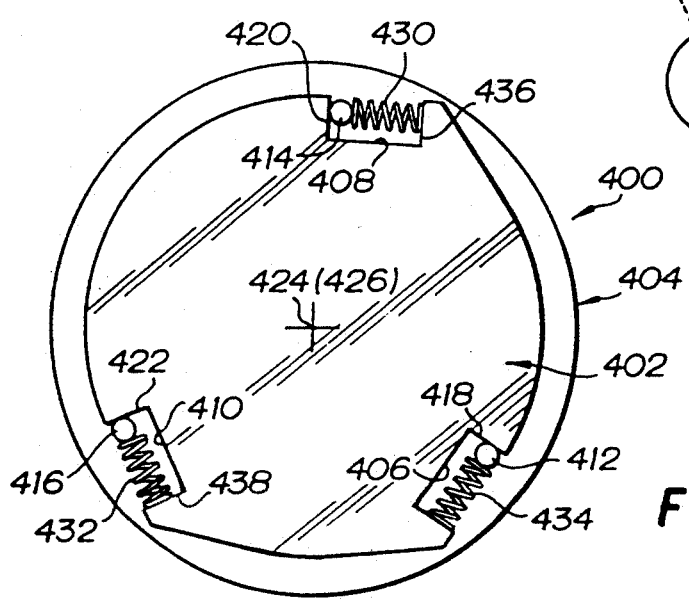
FIG. 12 is a top view of a fourth embodiment of the lens mounting arrangement, wherein three separate springs are used to bias the lens to rotate so that the three radial faces thereof are in abutment with the three radially disposed pins of the lens barrel.

Fourth Embodiment of the Lens Arrangement - FIG. 12

Referring now to FIG. 12, there is shown a fourth lens mounting arrangement, designated generally by the numeral 400, for seating a lens, designated generally by the numeral 402, in a barrel, designated generally by the numeral 404. In the fourth embodiment, the lens 402 has notches 406, 408, and 410, which align with pins 412, 414, and 416 in the barrel 404. The notches 406, 408, and 410 each have surfaces 418, 420, and 422 which are 120° apart with respect to the center 424 of the lens 402. The contact points of the pins 412, 414, and 416 are 120° apart with respect to the central axis 426 of the barrel 404.

Within the notches 406, 408, and 410 are individual springs 428, 430, and 432, respectively, which bear against radial faces 434, 436, and 438 of the notches. Since the lens 402 floats within the barrel 404, the individual springs 428, 430, and 432 cause the lens to rotate about instant centers, similar to the instant centers 144-146 of FIG. 9 and 316-320 of FIG. 11 until the optical center 424 of the lens aligns with the central axis 426 of the barrel 404. Like the element mounting embodiment of FIGS. 1-4 and the lens mounting arrangements of FIGS. 6-10, the arrangement of FIG. 12 centers an oriented lens, with the notches 406, 408, and 410 only aligning with the pins 412, 414, and 416 for one possible angular orientation of the lens 402 with respect to the barrel 404. However, if one spring-in-slot combination is reversed in FIG. 12, the arrangement would be non-orienting. For example, if the slot 410 extends in the opposite direction from that shown, with the spring 432 applying force against the pin 416 in the same counterclockwise direction as springs 430 and 434 against pins 414 and 412, respectively, the arrangement would be non-orienting.

Figure 13:
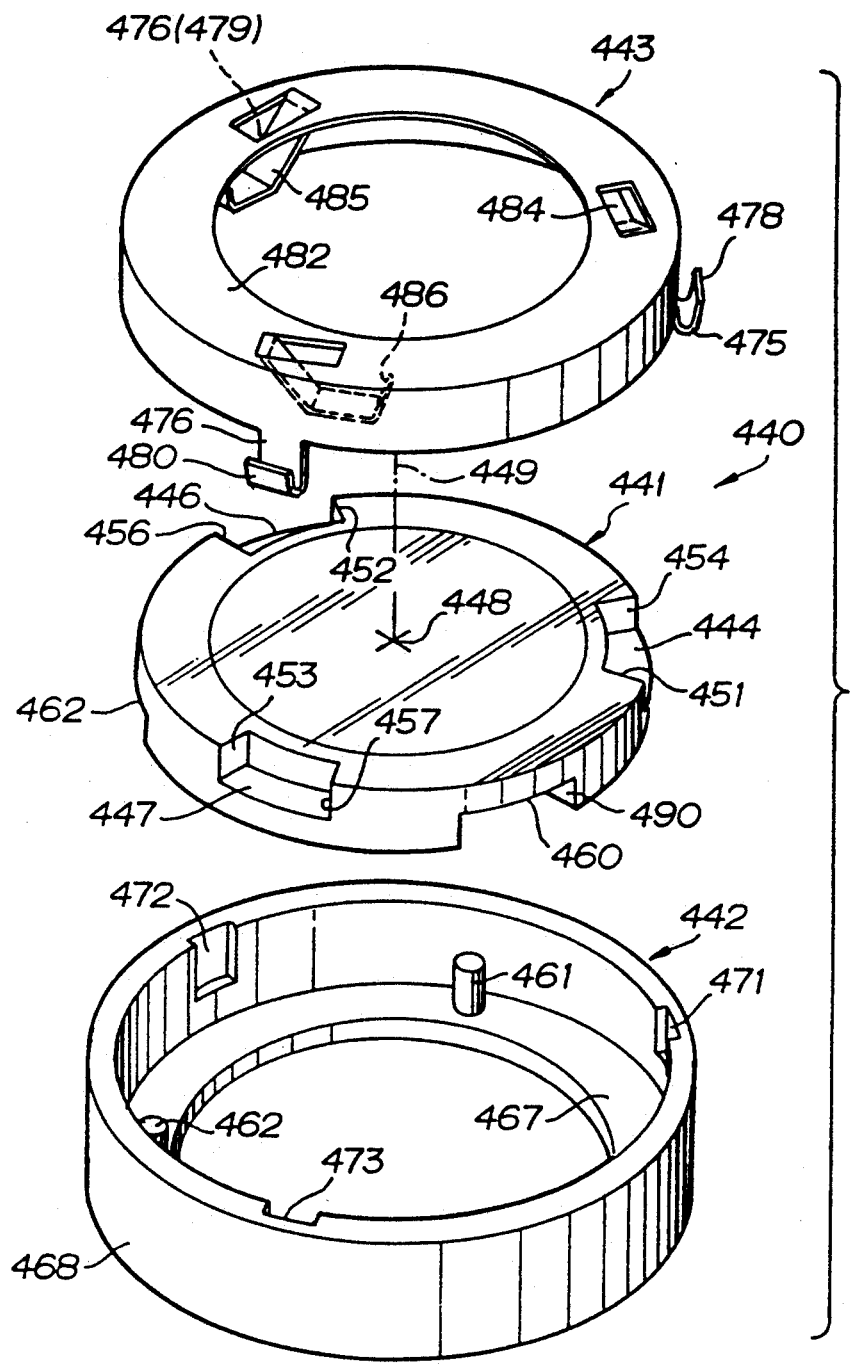
FIG. 13 is an exploded view of a fifth embodiment of the lens mounting arrangement, in perspective.
Figure 14:
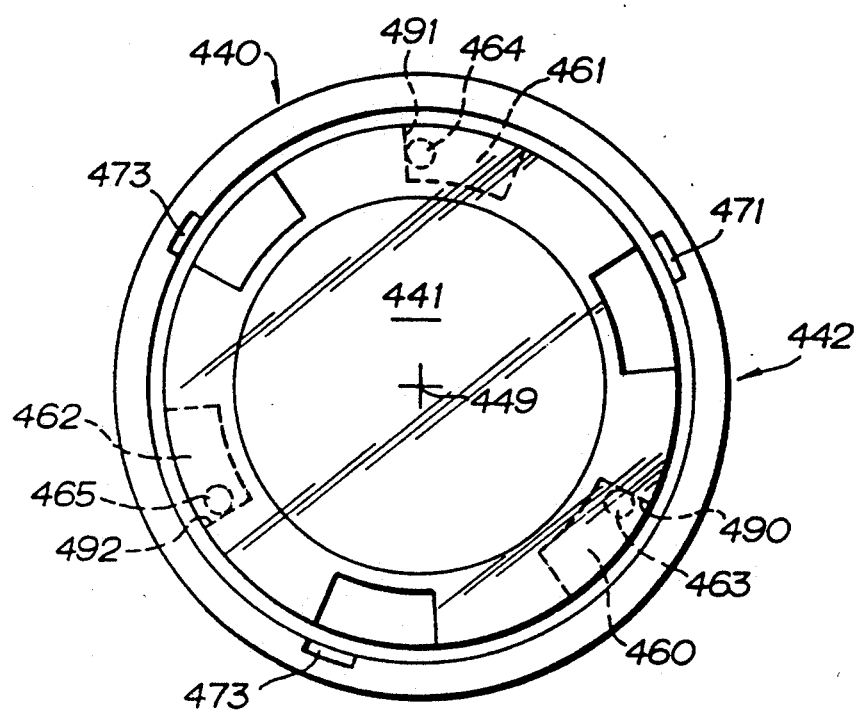
FIG. 14 is a top view of the lens mounting arrangement of FIG. 13.
Figure 15:
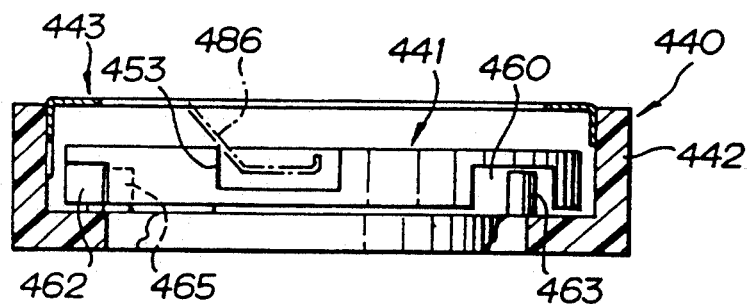
FIG. 15 is a side elevational view of the lens mounting arrangement of FIGS. 13 and 14.

Fifth Embodiment of the Lens Mounting Arrangement - FIGS. 13-15

Referring now to the fifth embodiment of the lens mounting arrangement, there is shown a lens mounting arrangement, designated generally by the numeral 440, wherein a lens, designated generally by the numeral 441, is retained in a lens barrel, designated generally by the numeral 442, by a retaining ring, designated generally by the numeral 443. The lens 440 has three peripheral notches 444, 446, and 467 which are equally spaced 120° apart about the point 448 through which the optical axis 449 of the lens passes. The notches 444, 446, and 447 each have radial faces 451, 452, and 453 and radial faces 454, 456, and 457. The lens 440 also includes three radial notches 460, 461, and 462, each spaced 120° apart on the back side thereof.

When the lens 441 is mounted in the barrel 442, three pins 463, 464, and 465 are received in the notches 460, 461, and 462, respectively, on the back side thereof to support the lens within the lens barrel. The lens 441 is free to rotate in the barrel to the extent of the width of the notches 460, 461, and 462, as well as to shift laterally. The pins 463, 464, and 465 project from an annular shoulder 467 which extends from an annular skirt 468 which, together with the shoulder, forms the barrel 442. The skirt 468 has axially extending slots 471, 472, and 473 formed therein.

After the lens 441 is mounted in the lens barrel 442, the retaining ring 443 is inserted into the barrel with U-shaped tabs 475, 476, and 477 being slidably received in the grooves 471, 472, and 473 of the skirt 468. The tabs 475, 476, and 477 each have prongs 478, 479, and 480 thereon, which bite into the walls of the grooves 471, 472, and 473, preventing the retaining ring 443 from being removed from the barrel 442.

The retaining ring 443 has a face flange 482, which has struck therefrom three spring tabs 484, 485, and 486. The spring tabs 484, 485, and 486 bear against the radial faces 451, 452, and 453 of the notches 444, 446, and 447, causing radial faces 490, 491, and 492 of notches 460, 461, and 462 to bear against the pins 463, 464, and 465 in the barrel 442 (see FIG. 14). Since the radial faces 490, 491, and 492 are equiangular, being spaced 120° apart, as are the pins 463, 464, and 465, an instant center is created by each point of abutment, and the lens 444 will rotate and laterally shift until all three pins 463, 464, and 465 are in abutment with the radial faces 490, 491, and 492, at which time the lens 441 will have its optical axis 449 aligned with the central axis of the lens barrel 442. As with the previously discussed embodiments, the clearance between the lens 441 and the inner skirt 468 of the lens barrel 442 accommodates thermal expansion and contraction of the lens, with the spring tabs 484, 485, and 486 keeping the lens 441 constantly centered.

Since the notches 460, 461, and 462 are spaced 120° apart, as are the notches 444, 446, and 447, it does not matter which notch 460, 461, and 461 is aligned with which pin 463, 464, and 465. An orientation marker 494 is positioned on the front face 495 of the lens 441 so as to indicate which surface of the lens is to face outwardly against the face flange 482 of the retaining ring 443.

Sixth Embodiment of the Lens Mounting Arrangement - FIGS. 16-19

Referring now to FIGS. 16-19, there is shown a sixth embodiment of a lens mounting arrangement, designated generally by the numeral 500. With the lens mounting arrangement 500, a lens, designated generally by the numeral 502, is mounted on a lens holder, designated generally by the numeral 504, and retained thereon by a retaining ring, designated generally by the numeral 506. The lens 502 has three notches 508, 510, and 512 formed in the periphery 514 thereof, spaced from one another by lands 509, 511, and 513. The notches 508, 510, and 512 are equiangular with respect to the optical center 516 of the lens so that corresponding first radial faces 518, 520, and 522 are each 120° apart, as are corresponding second radial faces 524, 526, and 528. The lens holder 504 has three pins 530, 532, and 534, each of which is spaced 120° apart. Consequently, when the lens 502 is mounted on the lens holder 504, it makes no difference which of the notches 508, 510, and 512 are aligned with which of the pins 530, 532, and 534. Accordingly, the arrangement of FIGS. 13–16 does not angularly orient the lens 502. Since the lens 502 is rotationally symmetrical about its optical axis 512, passing through center point 516, the angular position with respect to lens holder 504 is of no consequence.

Figure 17:
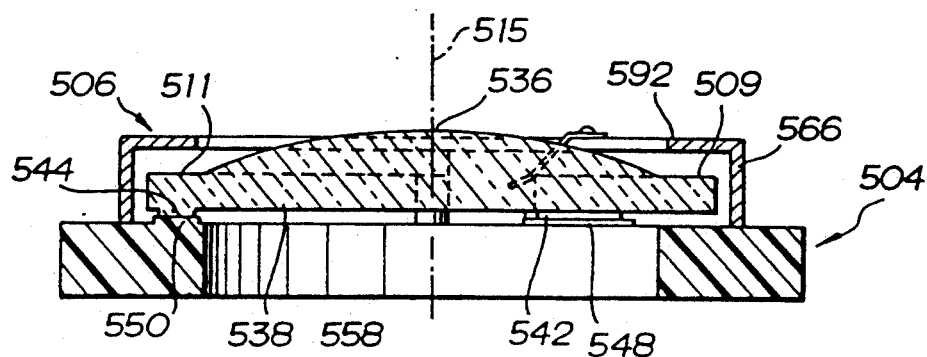
FIG. 17 is a side elevational view of the arrangement of FIG. 16, showing the elements thereof assembled.
Figure 19:
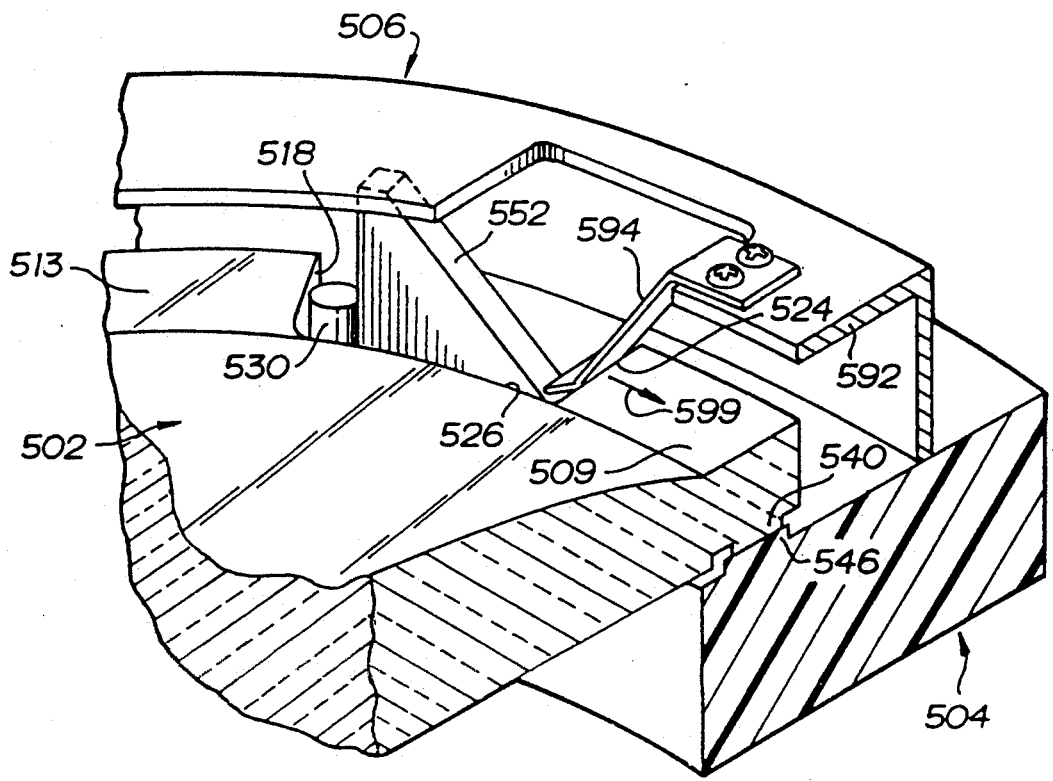
FIG. 19 is an enlarged perspective view of the arrangement of FIGS. 16-18, partially cut away to show operation of a spring on the retainer.

The lens 502 has an outer surface 536 and a rear surface 538; so it is critical to mount the lens with the rear surface 538 facing the lens holder 504. The rear surface 538 of the lens 502 has three pads 540, 542, and 544 which, as is shown in FIGS. 17 and 19, engage three lands 546, 548, and 550 on the lens holder 504, providing an additional indication as to proper lens orientation. Between the pins 530, 532, and 534 and the lands 546, 548, and 550, respectively, are ramps 552, 554, and 556, respectively. When the lens 502 has its optical axis 515 generally aligned with the geometric axis 558 of the lens holder 504 and the notches 508, 510, and 512 are aligned with pins 530, 532, and 534, the lens 502 will drop generally into position on the lens holder 504. This is because the ramps 552, 554, and 556 engage whichever of the respective radial faces 524, 526, or 528 are aligned therewith to generally position the lens 502 so that the radial faces 518, 520, and 522 are in proximity with the pins 530, 532, and 534. This initial mounting of the lens 502 on the lens holder 504 requires only that an axial force be applied to the lens—it could be the force of gravity or simply a push—so that if the radial faces 518, 520, and 522 are not in proximity with the pins 530, 532, and 534, the lens 502 will rotate to bring the radial faces and pins into proximity. The ramps 552, 554, and 556 also serve to position the lens 502 so that the pads 540, 542, and 544 abut the lands 546, 548, and 550 on the lens holder 504.

While the radial faces 518, 520, and 522 are in proximity with the pins 530, 532, and 534, they do not necessarily engage the pins so as to precisely position the lens 502 with its optical axis 516 in exact alignment with the central axis 558 of the lens holder 504. Exact alignment is accomplished upon mounting the retaining ring 506. The retaining ring 506 has three legs 560, 562, and 564 which are 120° apart projecting from a skirt portion 566. The legs 560, 562, and 564 are received in slots 568, 570, and 572, aligned with the pins 530, 532, and 534. The tabs 560, 562, and 564 have pins 574, 576, and 578, which register with bores 580, 582, and 584 in the slots 568, 570, and 572. Set screws 586, 588, and 590 secure the retaining ring 506 in place over the lens 502.

The retaining ring 506 has an annular face flange 592 thereon, Which overlies the lands 509, 511, and 513 on the lens 502 and three springs 594, 596, and 598, which bear against the radial faces 524, 526, and 528 so as to urge the lens 502 to rotate about any instant centers of rotation provided by abutment of the pins 530, 532, and 534 with radial faces 518, 520, and 522 of the lens. The spring fingers 594, 596, and 598 apply force with axial and rotary components to the radial faces 524, 526, and 528 of the lens, which axial components further have lateral components 599 (FIG. 19), which tend to rotate the lens 502 to its stable position where there is abutment between the pins 530, 532, and 534 and the radial faces 518, 520, and 522. In this way, the optical center 516 of the lens 502 is brought into precise alignment with the axis 558 of the lens holder 504.

Figure 18:
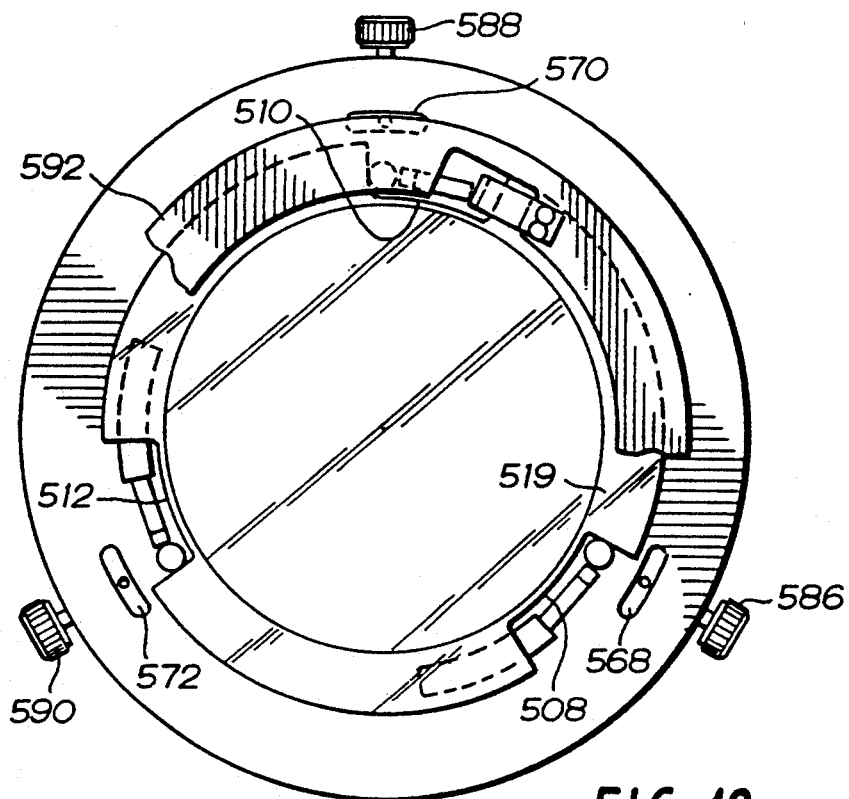
FIG. 18 is a top view of the arrangement of FIGS. 16 and 17 with the cover partially cut away.

As is seen in FIG. 18, the pins 530, 532, and 534 do not bottom in notches 508, 510, and 512 so as to avoid manufacturing errors at the upper edge of the radial faces 518, 520, and 522, while the springs 594, 596, and 598 allow slight rotational movement of the lens 502. Consequently, as the lens 502 expands and contracts due to changes in temperature or humidity, there is nothing to inhibit radial expansion and contraction of the lens and nothing to inhibit rotational movement of the lens should the lens expand slightly in the arcuate direction against the pins 530, 532, and 534. Accordingly, the lens 502 is precisely positioned so that the center point 516 and optical axis 558 of the lens are in alignment with the geometric axis of the lens holder 504, while allowing expansion and contraction of the lens without introducing forces therein which might tend to mechanically distort the lens and thus the image transmitted thereby.

Figure 20:
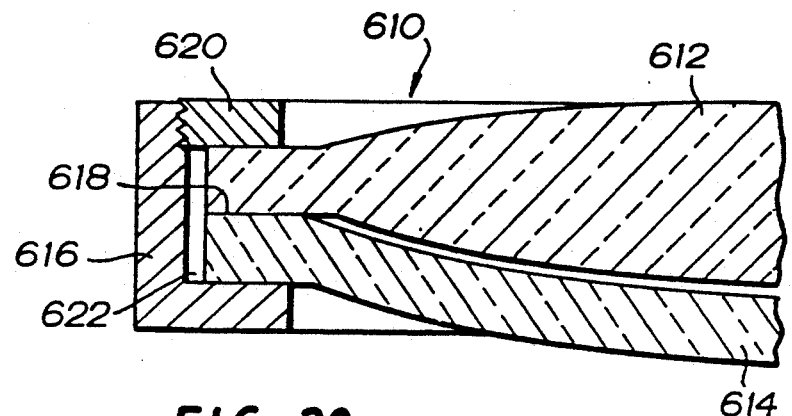
FIG. 20 is a side elevational view of a prior art stack design wherein two lenses mounted in a lens holder are in direct abutment with one another.
Figure 21:
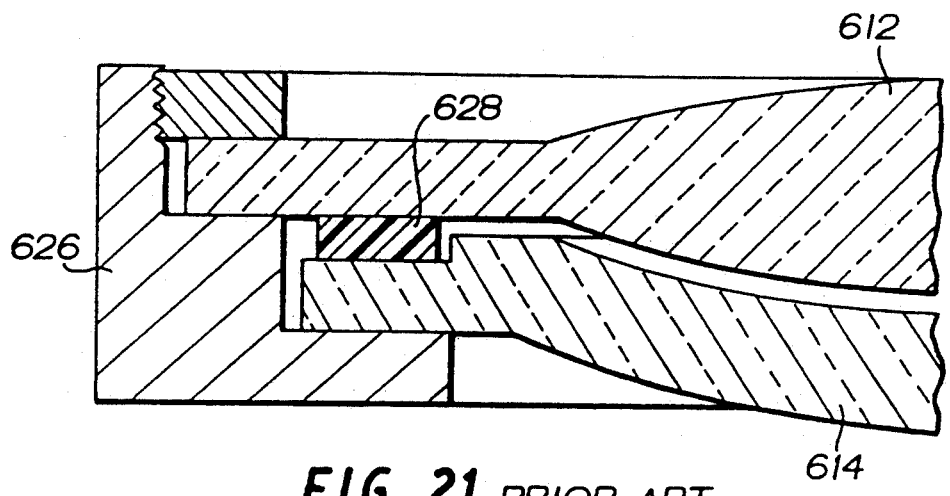
FIG. 21 is a side elevational view of a prior art non-stacked configuration wherein a pair of lenses is mounted in a barrel, with the lenses not touching one another.

Prior Art Mounting of Lens Pairs - FIGS. 20 and 21

Referring now to FIG. 20, there is shown a first prior art arrangement, designated generally by the numeral 610, for mounting a pair of lenses 612 and 614 within a lens retaining barrel 616. It is seen that the lenses 612 and 614 abut one another at flat areas 618 proximate their peripheries. The lenses 612 and 614 are held in the lens barrel 616 by a retaining ring 620, with a clearance 622 provided between the barrel 616 and the periphery of the lenses 612 and 614. In the arrangement of FIG. 20, the lens 612 is stacked on the lens 614, which increases the uncertainty as to the position of both lenses. When the lenses 612 and 614 are mounted in accordance with the arrangement of FIG. 20, the lenses may be out of optical alignment with both one another and the optical axis of the system.

Referring now to FIG. 21, there is shown another prior art arrangement, designated generally by the numeral 624, in which the lenses 612 and 614 are mounted in a stepped lens mounting barrel 626 and are separated by an elastic ring 628. Again, the lenses 612 and 614 are subject to misalignment with one another and with the optical axis of the system.

Figure 22:
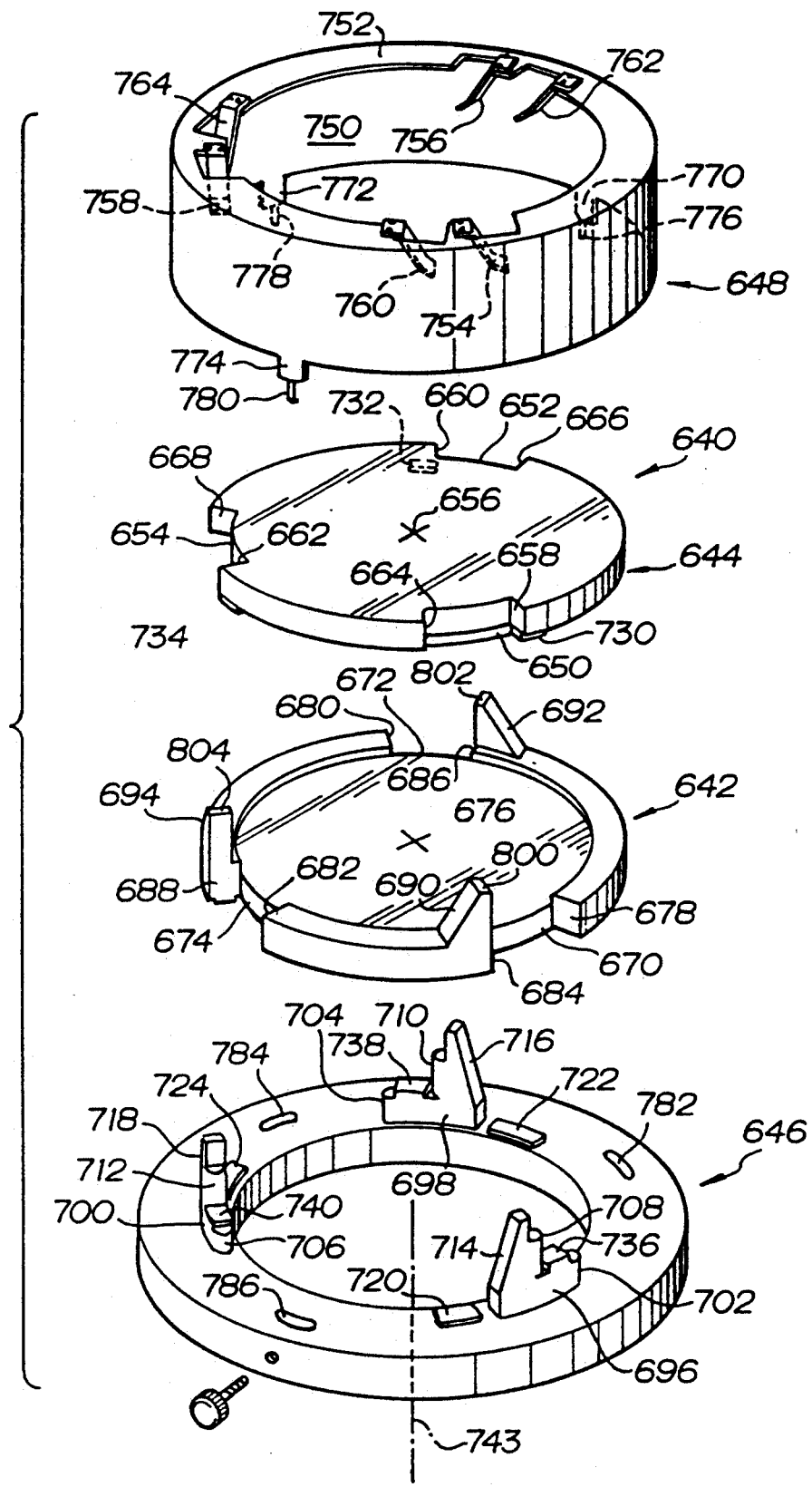
FIG. 22 is an exploded perspective view of a seventh embodiment of the lens mounting arrangement showing a pair of lenses positioned for retention on a single lens holder by a single retaining element.
Figure 23:
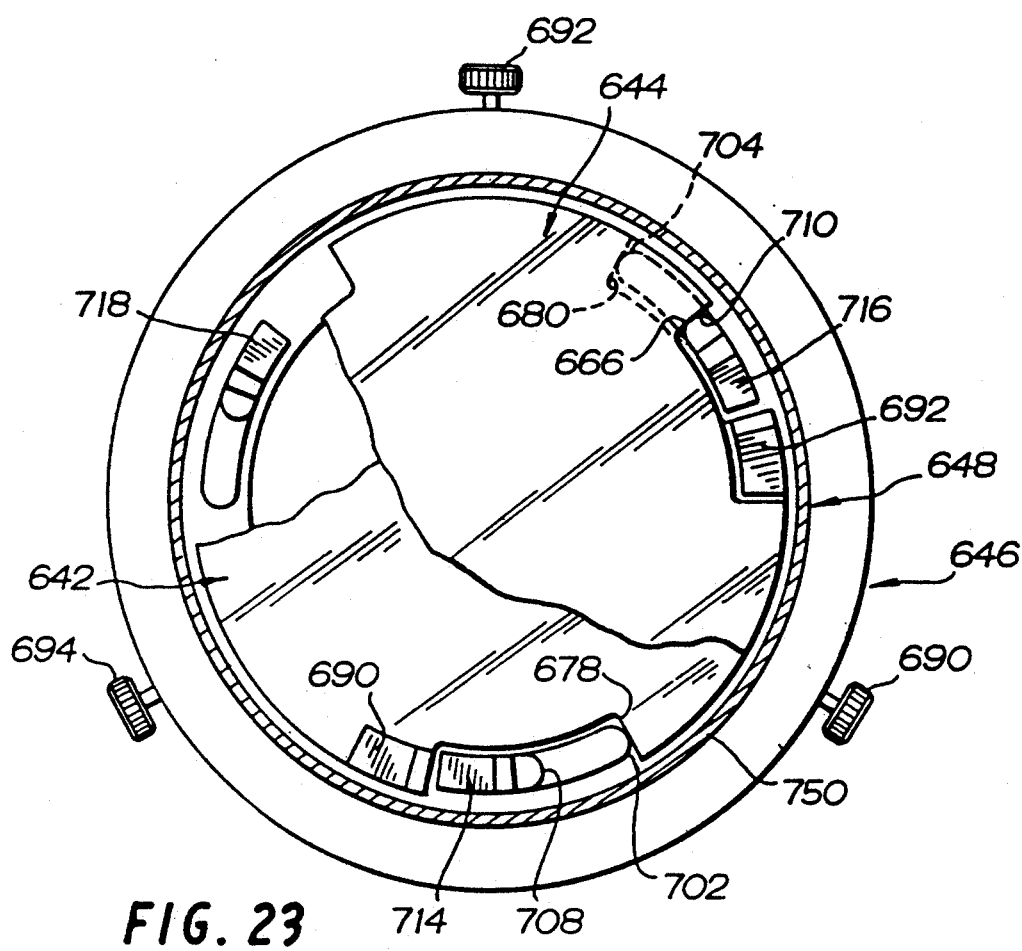
FIG. 23 is a top view of the arrangement of FIG. 22 showing the components assembled.
Figure 24:
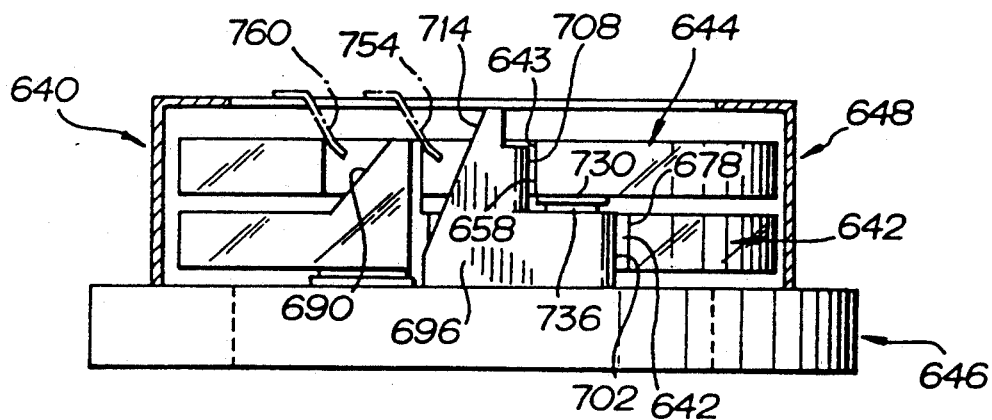
FIG. 24 is a side elevation of FIG. 23 with a cover portion in section.

Seventh Embodiment of the Lens Mounting Arrangement - FIGS. 22-24

Referring now to FIGS. 22-24, a sixth lens holding arrangement, designated generally by the numerals 640, is shown wherein a first lens, designated generally by the numeral 642, has a second lens, designated generally by the numeral 644, stacked thereon to provide a lens pair arrangement used for the same purpose as the lens pair arrangements of FIGS. 21 and 22. The lenses 642 and 644 are stacked on a lens holder, designated generally by the numeral 646, and are retained thereon by a retaining ring, designated generally by the numeral 648.

The second lens 644 has peripheral notches 650, 652, and 654 therein disposed at equal 120° angles about the optical center 656 of the lens. As with the sixth embodiment of the invention (FIGS. 16-19), the notches 650, 652, and 654 each have first radial faces 658, 660, and 662 separated angularly by 120° from one another and second radial faces 664, 666, and 668 also separated from one another by 120° angles.

The first lens 642 has peripheral notches 670, 672, and 674 disposed at angular separations of 120° to the optical center 676 of the lens. The notches 670, 672, and 674 have first radial faces 678, 680, and 682, respectively, each spaced 120° from one another, and second radial faces 684, 686, and 688 spaced 120° from one another. Adjacent the second radial faces 684, 686, and 688 of the first lens 642 are ramps 690, 692, and 694, respectively.

The lens holder 646 includes three projections 696, 698, and 700, which have pairs of staggered, rounded abutment surfaces thereon which correspond in function to the pins 530, 532, and 534 of the embodiment of FIGS. 16-19. The projections 696, 698, and 700 have lower abutment surfaces 702, 704, and 706, as well as upper abutment surfaces 708, 710, and 712. In addition, the projections 696, 698, and 700 have ramps 714, 716, and 718, respectively. Juxtaposed with the ramps 714, 716, and 718 are lands 720, 722, and 724, upon which the first or lower lens 642 rests.

In assembling the lens mounting arrangement 640, the first lens 642 is positioned with the slots 671, 672, and 674 in general alignment with the projections 696, 698, and 700. When the first lens 642 is dropped over the projections 696, 698, and 700, the ramps 714, 716, and 718 engage radial faces 684, 686, and 688, respectively, so as to slightly rotate the first lens 642 and bring the radial faces 678, 680, and 682 of the lens into juxtaposition with the abutment surfaces 702, 704, and 706, respectively. Since the projections 696, 698, and 700 and the notches 670, 672, and 674 are equiangular (spaced 120° apart), it makes no difference which notch is aligned with which projection. Moreover, the ramps 690, 692, and 694 on the first lens 642 provide ready indication as to which side of the second lens faces the lens holder 646. It is emphasized here that there may be clearance between abutments 702, 704, and 706 and the radial faces 678, 680, and 682 so that there is play between the first lens 642 and the lens holder 646.

Subsequent to mounting the first lens 642, the second lens 644 is superimposed over the first lens by aligning the notches 650, 652, and 654 on the first lens with the ramps 690, 692, and 694 on the first lens. Upon releasing the second lens 644 so as to fall onto the first lens 642, or otherwise applying an axial force to the second lens, the radial faces 644, 666, and 668 of the second lens engage the ramps 690, 692, and 694 of the first lens, if the notches 650, 652, and 654 are not completely aligned to cleanly receive both the ramps 690, 692, and 694 and the abutments 708, 710, and 712 on the projections 696, 698, and 700 of the lens holder 646. In order to bring the radial faces 658, 660, and 662 into proximity with the abutments 708, 710, and 712 on the projection 696, 698, and 700 of lens holder 646, the ramps 690, 692, and 694 rotate the second lens 644 slightly in a clockwise direction with respect to FIGS. 22 and 23, as the second lens is released to move in an axial direction with respect to the first lens 642 and the lens holder 646. While gravity may supply the axial force to bring the lens 644 into abutment with the first lens 642, any other sufficient axial force may suffice.

As is seen in FIG. 24, the second lens 644 has three areas 730, 732, and 734 (FIG. 23) which abut pads 736, 738, and 740 on the projections 696, 698, and 700, respectively, of the lens holder 646. As is seen FIG. 24, this ensures that the lenses 642 and 644 do not abut one another, but rather only abut surfaces rigidly associated with the lens holder 646.

As is seen in FIG. 24, there may initially be a gap indicated by the numeral 742 between at least one of the radial faces 658, 660, and 662 and the respective abutments 708, 710, and 712, as well as a gap 743 between at least one of the radial faces 678, 680, and 680 and their respective abutments 702, 704, and 706. Accordingly, there is play between the first lens 642 and the lens holder 646, as well as play between the second lens 644 and the lens holder 646. Consequently, the optical axes of the lens 642 and 644 do not necessarily align with the geometric axis 943 of the lens holder 646.

The retaining ring 648 is used to substantially simultaneously cause the first and second lenses 642 and 644 to move into abutment with the abutting surfaces of the three projections 696, 698, and 700 on the lens holder 646. The retaining ring 648 has a peripheral skirt 750 and a face flange 752. Projecting from the face flange 752 are first spring fingers 754, 756, and 758 and second spring fingers 760, 762, and 764 juxtaposed with the first leaf springs. The leaf springs 754, 756, and 758 are disposed 120° apart, as are the leaf springs 760, 762, and 764. Projecting beneath the skirt 750 are tabs 770, 772, and 774, which have pins 776, 778, and 780 projecting therefrom.

Figure 16:
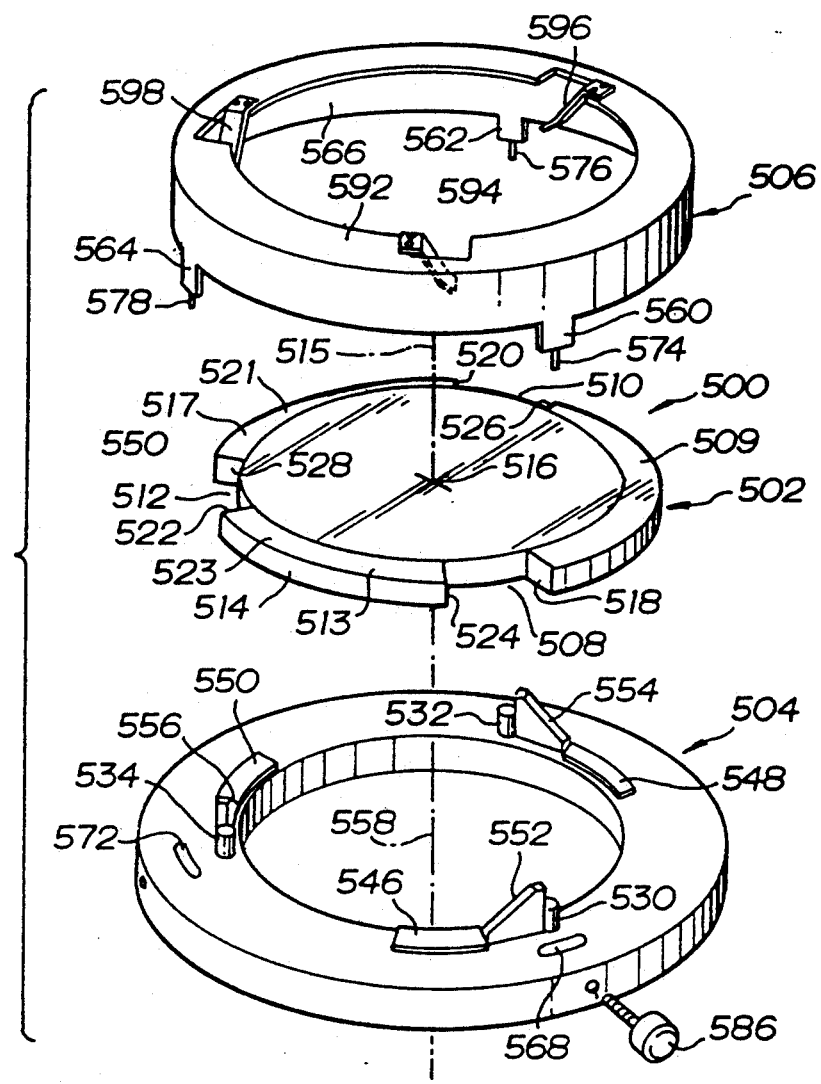
FIG. 16 is a perspective view of a sixth embodiment of the lens mounting arrangement, wherein three ramps positioned adjacent the radially disposed projections on a lens holder cooperate with three radially disposed springs on a retainer to precisely align the optical axis of the lens with the central axis of the lens holder.

When the retaining ring 648 is mounted over the assembly of the first and second lenses 642, 678, and lens holder 646, the tabs 770, 772, and 774 are aligned with slots 782, 784, and 786 in the lens holder, each of which slots has bores therein for receiving the pins 776, 778, and 780, respectively, in the same manner as the embodiments of FIGS. 16-18. Aligned with each of the slots 782, 786, and 788 are set screws 790, 792, and 794 which, in the same manner as FIG. 18, bear against the tabs 770, 772, and 774 to hold the retaining ring 648 in place.

As the retaining ring 648 is pressed home, the first spring fingers 754, 756, and 758 bear against and apply lateral forces to the top corners 800, 802, and 804 of the ramps 690, 692, and 694 on the first lens 642. The lateral forces applied by the first spring fingers cause the first lens 642 to pivot about the instant centers created by abutment between the radial faces 678, 680, and 682 on the first lens with the abutments 702, 704, and 706, respectively, on the lens holder 646.

Simultaneously with precisely orienting the lens 642, the second lens 644 is oriented by engaging the second radial faces 664, 666, and 668 with the second spring fingers 760, 762, and 764, which cause the second lens 644 to rotate about the instant centers which occur upon the engagement of radial faces 658, 660, and 662 with abutments 708, 710, and 712 on the lens holder 646.

When both lenses 642 and 644 are restrained by the abutment of three radial faces with the projections 696, 698, and 700 on the lens holder 646, the optical axes passing through center point 656 of lens 644 and center point 676 of lens 642 are in alignment with one another and the geometric axis 743 of the lens holder 646.

As with the other embodiments of the invention, the lenses 642 and 644 are free to expand both radially and arcuately, independent of one another, since the abutments 702, 704, and 706 do not bottom in the notches 670, 672, and 674, and the abutments 708, 710, and 712 do not bottom in the notches 650, 652, and 654, respectively. First spring fingers 754, 756, and 758 and second spring fingers 760, 762, and 764 allow the lens mounting arrangement 640 to accommodate any rotational components which may be induced by thermal expansion or contraction of the lenses 642 and 644.

Figure 25:
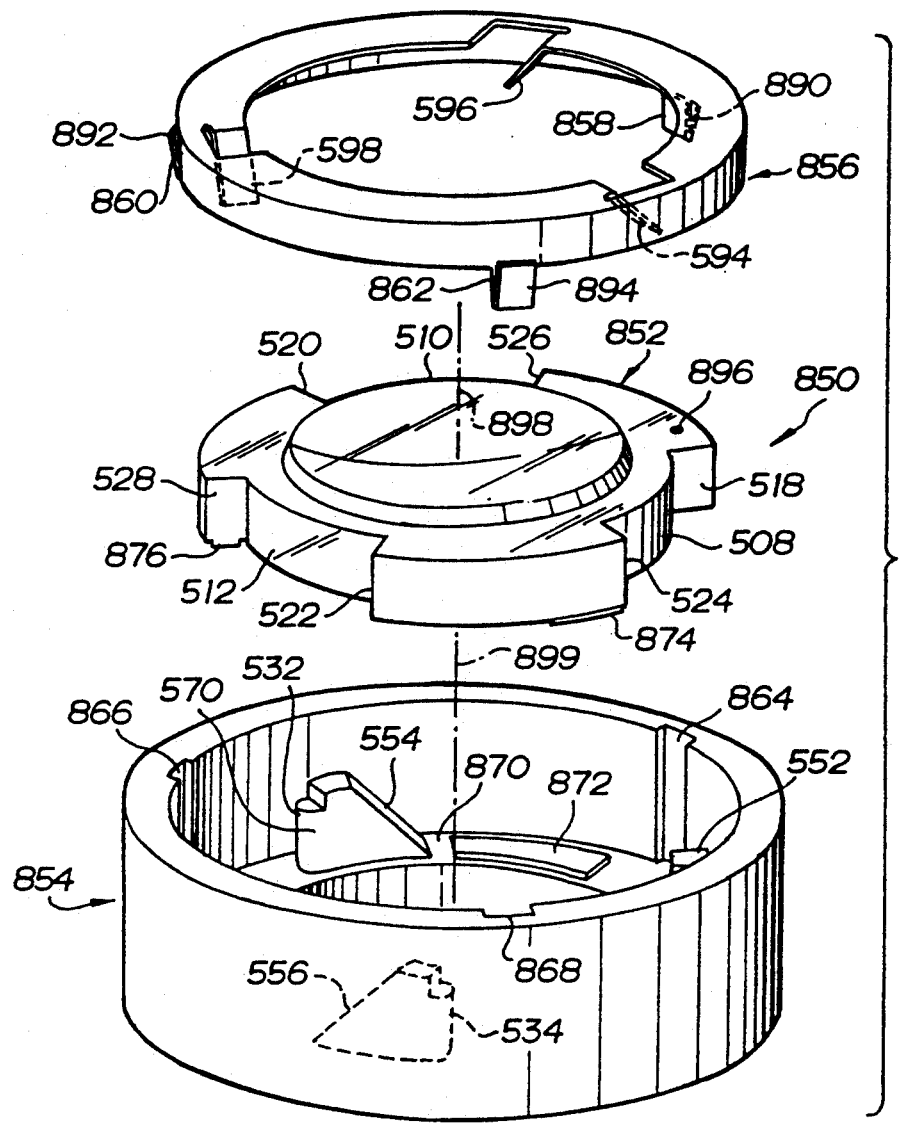
FIG. 25 is an exploded, enlarged perspective view of an arrangement for mounting a single lens in a lens barrel, such as a camera lens barrel, employing the principles of the embodiment of FIGS. 16-19.
Figure 26:
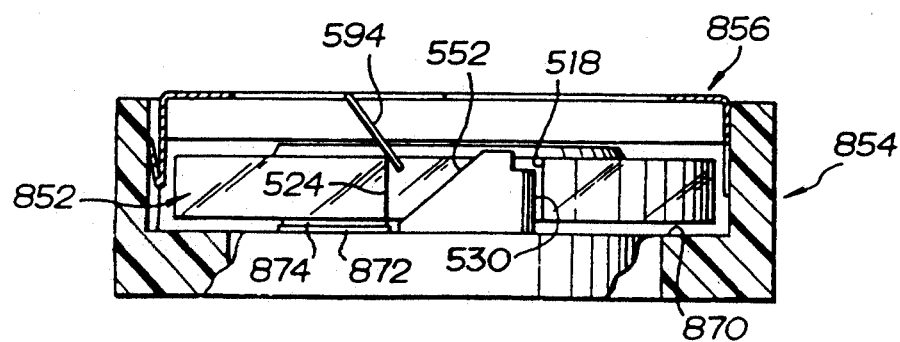
FIG. 26 is a side elevational view, partially cut away, of the arrangement of FIG. 25 in assembled form.

Arrangements for Mounting a Lens Element in a Barrel - FIGS. 25 and 26

Referring now to FIGS. 25–26, there is shown an arrangement, designated generally by the numeral 850, for mounting a lens element, such as a molded plastic lens element used as one of a set of elements making up a zoom lens, designated generally by the numeral 852, in a lens barrel, designated generally by the numeral 854, used with cameras. In the arrangement of FIGS. 25 and 26, the principles of lens mounting set forth in FIGS. 16–19 are utilized, with similar reference numerals identifying similar structures which function in substantially similar ways.

A retaining ring, designated generally by the numeral 856, is received within the plastic barrel 854 and holds the lens 852 in place. The retaining ring 856 has three V-shaped depending tabs 858, 860, and 862 which are received in axially extending grooves 864, 866, and 868 extending in the barrel 854. The grooves 864, 866, and 868 bottom on an annular flange 870 which includes pads 872 upon which pads 874, 876, and 878 on lens 852 rest. The V-shaped tabs 858, 860, and 862 include prongs 890, 892, and 894, which bite into the bottoms of the grooves 864, 866, and 868 to prevent the retaining ring 856 from being withdrawn.

In order to discern which surface of the plastic lens 852 should face the retaining ring 856, the plastic lens has an orientation mark 896 on one surface thereof. Upon inserting the retaining ring 856 axially into the barrel 854, the optical axis 898 of the plastic lens 852 aligns with the central axis 899 of the lens barrel 854, as spring fingers 594, 596, and 598 apply lateral force to the radial faces 524, 526, and 528 of the lens to bring radial faces 518, 520, and 522 into engagement with abutments 530, 532, and 534, using the same principles discussed with respect to FIGS. 16–19.

Figure 27:
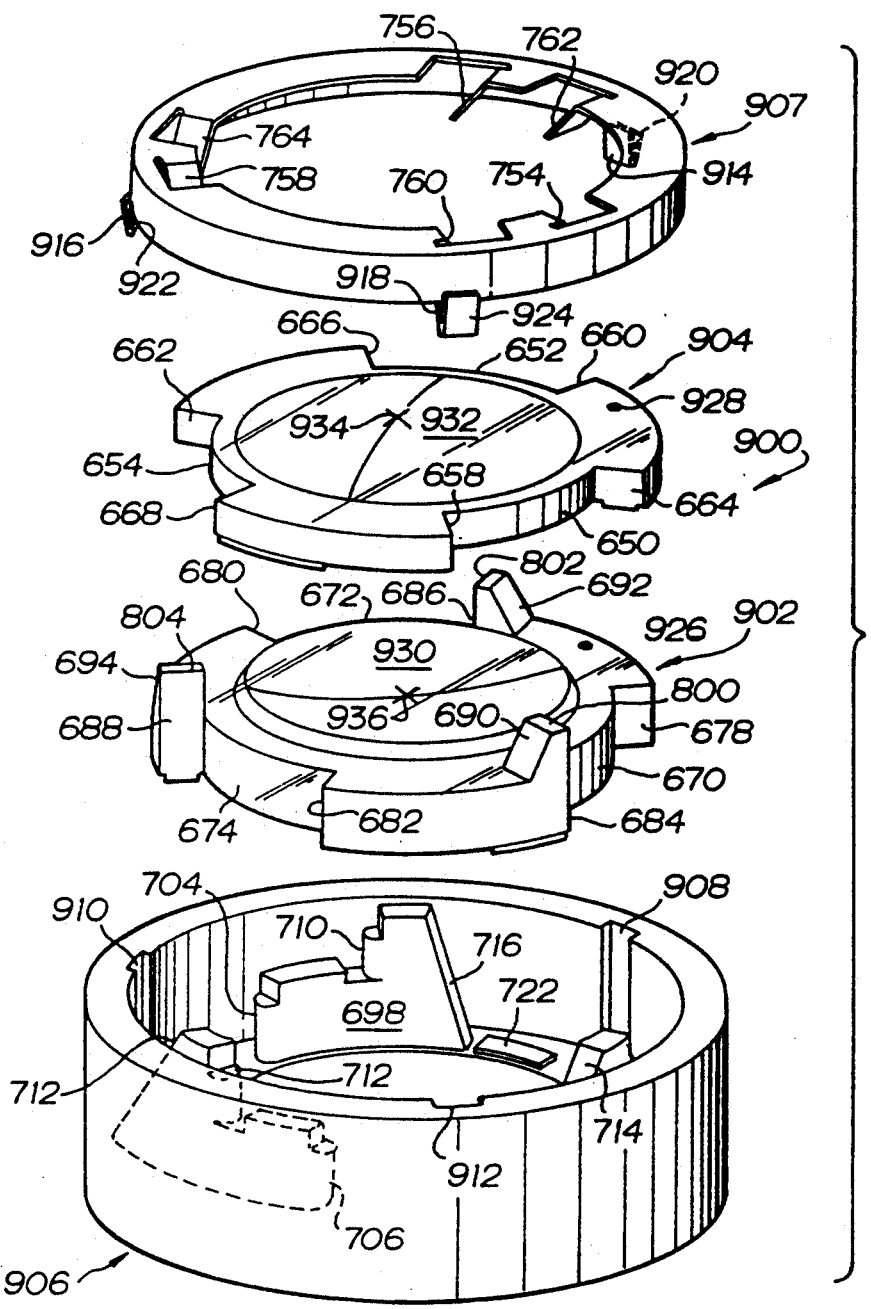
FIG. 27 is an exploded, enlarged perspective view of an arrangement for mounting a pair of lenses in a lens barrel, such as a camera lens barrel, employing the principles of the embodiment of FIGS. 22-24.
Figure 28:
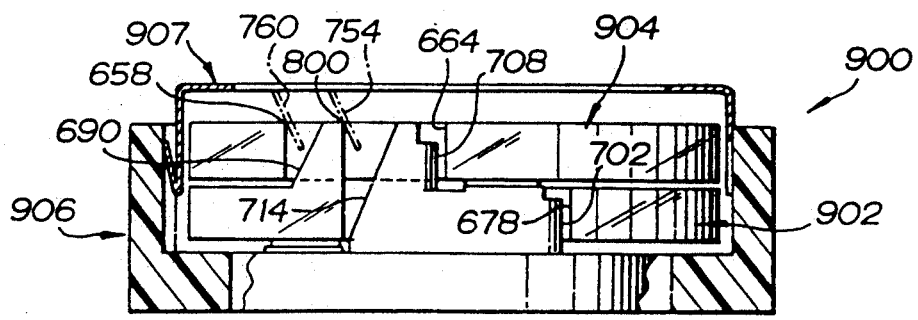
FIG. 28 is a side elevational view, partially cut away, of the arrangement of FIG. 27 in assembled form.

Arrangement for Mounting a Double Lens in a Lens Barrel - FIGS. 27 and 28

Referring now to FIGS. 27 and 28, there is shown an arrangement, designated generally by the numeral 900, for retaining first and second plastic lenses, designated generally by the numerals 902 and 904, in a lens housing, designated generally by the numeral 906, with a retaining ring, designated generally by the numeral 907. The structure and function of the lens mounting arrangement 900 is similar to that of FIGS. 21–24, with the same reference numerals identifying similar structure.

The lens mounting arrangement 900 utilizes the lens barrel 906 rather than the lens holder 646 of FIGS. 21–24 and is particularly suitable for mounting pairs of elements in plastic zoom lenses used with cameras. The barrel 906 has three grooves 908, 910, and 912 extending axially therein, which grooves receive V-shaped tabs 914, 916, and 918 depending from the retaining ring 907. The V-shaped tabs have prongs 920, 922, and 924 thereon, which frictionally engage the bottoms of the grooves 908, 910, and 912 to retain the retaining ring 907 in place within the lens barrel 906. The first and second lenses 902 and 904 each include orientation markers 926 and 928, respectively, on the upwardly or outwardly facing surfaces 930 and 932 thereof to indicate proper orientation of the lenses.

As with the embodiment of FIGS. 21–24, the retaining ring 907 has three pair of spring arms disposed at 120° intervals. As is seen in FIG. 28, spring arm 754, depending from retaining ring 907, engages radial face 800 opposite the ramp 690 of the first lens 902, while spring arm 760, depending from the retaining ring, engages the radial face 658 on the second lens 904 as the retaining ring is pressed axially into position. Similar forces are applied by spring arm pairs 756, 762 and 758, 764 to the radial faces 802, 660 and 804, 662, respectively of lenses 902, 904. Consequently, the lenses 902 and 904 rotate about instant centers and shift until, as in the embodiment of FIGS. 22–24, radial faces 664 and 668 of lenses 902 and 904 engage abutments 702 and 708 (FIG. 28), radial faces 666 and 680 engage abutments 710 and 704, and radial faces 668 and 682 engage abutments 712 and 706.

Upon engagement of the radial faces of the plastic lenses 902 and 904 with the abutments of the lens barrel 904, the plastic lenses are thereafter mounted in a clearance-free, exact centering fit which also allows for thermal and humidity expansion and contraction with minimal image distortion.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. An arrangement for mounting an element on an element holder, the element and element holder comprising two components each having a predetermined center, the arrangement comprising:
   three spaced abutments on one of the components, the three spaced abutments being selectively positioned around the predetermined center thereof;
   three first radial faces on the other component, the three first radial faces extending radially with respect to the predetermined center thereof; and
   means for causing relatively movement between the components when the spaced abutments and radial faces are in proximity with one another to cause each first radial face to abut a separate abutment with the predetermined centers of the components precisely coinciding when each radial face abuts an abutment.

2. The arrangement of claim 1 wherein the abutments on one of the components are spaced so as to be located at the axis of an equilateral triangle having a center coinciding with the predetermined center of said one component, and wherein the center of the other component is aligned with the center of the equilateral triangle.

3. The arrangement of claim 2, wherein the first radial faces are spaced 120° apart.

4. The arrangement of claim 3, wherein the other component includes three second radial faces and wherein the first radial faces cooperate with the second radial faces to form notches which are equiangularly spaced about the predetermined center of the component.

5. The arrangement of claim 3, wherein the other component includes second radial faces and wherein the first radial faces cooperate with the second radial faces to form notches which are not equiangularly disposed, which notches each aligns selectively with a respective one of the abutments so that each notch accommodates an abutment for only one orientation of the element with respect to the element holder.

6. The arrangement of claim 5, wherein the element is a lens, and the element holder is a lens holder.

7. The arrangement of claim 6, wherein the lens holder is a lens barrel, and the means for causing relative movement between the lens and lens holder is a retaining ring with means associated therewith for engaging the second radial faces to shift the lens as the retaining ring is installed in the lens barrel.

8. The arrangement of claim 3, wherein the other component includes second radial faces positioned in opposed relation with respect to the first radial faces, the second radial faces being spaced from one another 120° apart with respect to the predetermined center of the other component to form notches for receiving the abutments.

9. The arrangement of claim 8, wherein the component comprising the element is a lens, and the component comprising the element holder is a lens holder.

10. The arrangement of claim 9, wherein the lens holder is a lens barrel, and the means for causing relative movement between the lens and lens holder is a retaining ring with means associated therewith for engaging the second radial faces to shift the lens as the retaining ring is installed in the lens barrel.

11. An arrangement for mounting an element having a clearance-free and exact centering fit on an element holder, comprising:
a generally cylindrical element holder having three radially disposed projections each having a firs side and a second side facing opposite the first side, the three radially disposed projections being positioned proximate an inner diameter surface of the cylindrical element holder;
a generally circular element adapted to fit inside of said element holder in a manner to provide a clearance therebetween, said element having three radial faces proximate an outer diameter portion thereof to match the three radially disposed projections of said element holder; and
means for seating the three radial faces of said element against the three corresponding radially disposed projections of said element holder by providing a translational force such that two radially disposed projections contact two corresponding radial faces with the first sides thereof and the third radially disposed projection contacts one of the radial faces with the second side thereof to automatically center said element within said element holder.

12. An arrangement for mounting an element as in claim 11, wherein:
said generally cylindrical element holder comprises a lens barrel;
said generally circular element comprises a lens; and
said means for seating comprises a retaining ring having means for engaging the lens as the retaining ring is secured to the lens barrel.

13. An arrangement for mounting an element as in claim 12, wherein:
the three radially disposed projections proximate the inner diameter surface of said lens barrel comprise pins; and
the three radial faces on the outer diameter portion of said lens each comprises a radial face of a notch.

14. An arrangement for mounting an element as in claim 12, wherein:
the three radially disposed projections proximate the inner diameter surface of said lens barrel each comprises a radial face of a molded projection; and
the three radial faces on the outer diameter portion of said lens each comprises a radial face of a notch.

15. An arrangement for mounting an element as in claim 12, wherein:
the three radially disposed projections proximate the inner diameter surface of said lens barrel comprise pins; and
the three radial faces on the outer diameter portion of said lens each comprises a radial face of a tab.

16. An arrangement for mounting an element as in claim 12, wherein:
the three radially disposed projections proximate the inner diameter surface of said lens barrel each comprise a radial face of a molded projection; and
the three radial faces on the outer diameter portion of said lens each comprises a radial face of a tab.

17. An arrangement for mounting an element having a clearance-free and exact centering fit on an element holder, comprising:
a generally cylindrical element holder having three radially disposed projections proximate an inner diameter surface thereof;
a generally circular element adapted to fit inside of said element holder in a manner to provide a small clearance therebetween, said element having three radial faces proximate an outer diameter surface thereof to match the three radial projections of said element holder; and
means for seating the three radial faces of said element against the three corresponding radially disposed projections of said element holder by providing a torque such that the radially disposed projections contact corresponding radial faces on the same side to automatically center said element within said element holder.

18. An arrangement for mounting an element as in claim 17, wherein:
said generally cylindrical element holder comprises a lens barrel;
said generally circular element comprises a lens; and
said means for seating comprises a spring member having first and second ends, the first end of said spring member contacting said element holder and the second end of said spring member contacting said element.

19. An arrangement for mounting an element as in claim 18, wherein:
the three radial projections proximate the inner diameter surface of said lens barrel comprise pins; and
the three radial faces on the outer diameter surface of said lens each comprises a radial face of a groove.

20. An arrangement for mounting an element as in claim 18, wherein:
the three radial projections proximate the inner diameter surface of said lens barrel each comprises a radial face of a molded projection; and
the three radial faces on the outer diameter surface of said lens each comprises a radial face of a groove.

21. An arrangement for mounting an element as in claim 18, wherein:
the three radial projections proximate the inner diameter surface of said lens barrel comprise pins; and
the three radial faces on the outer diameter surface of said lens each comprise a radial face of a tab.

22. An arrangement for mounting an element as in claim 18, wherein:
the three radial projections proximate the inner diameter surface of said lens barrel each comprises a radial face of a molded projection; and
the three radial faces on the outer diameter surface of said lens each comprises a radial face of a tab.

23. An arrangement for mounting an element as in claim 18, wherein:
said element holder is a cylindrical lens barrel having the three radially disposed projections;
said element is a cylindrical lens element having the three radial faces; and
said spring member is configured as a retainer ring attachably secured to said lens barrel, the retainer ring having a resilient tab selectively located thereon to provide a radial force for seating the radial faces of the lens element against the radially disposed projections of the lens barrel.

24. An arrangement for mounting a lens having a clearance-free and exact centering fit on an element holder, comprising:
a generally cylindrical lens holder having three radially disposed projections each having a first side and a second side facing opposite the first side, the three radially disposed projections being positioned proximate an inner diameter surface thereof, the lens being a generally circular lens adapted to fit inside of said holder in a manner to provide a small clearance therebetween, said lens having three radial faces proximate an outer diameter surface thereof to match the three radially disposed projections of said lens holder; and
means for seating the three radial faces of said lens against the three corresponding radially disposed projections of said lens holder by providing a translational force such that two radially disposed projections contact two corresponding radial faces on the same side and the third radially disposed projection contacts its corresponding radial face on the opposite side to automatically center said lens within said lens holder.

25. An arrangement for mounting a lens having a line of focus in a lens holder having an axis which is an optical axis with which the line of focus of the lens aligns with precision, comprising:
three abutments on the lens holder spaced 120° apart with respect to the optical axis;
three radial faces on the lens spaced 120° apart with respect to the line of focus of the lens; and
means for causing relative movement between the lens and lens holder after the spaced abutments and radial faces are brought into proximity with one another by mounting the lens on the lens holder to bring each radial face into engagement with an abutment, whereby the line of focus of the lens aligns with the optical axis defined by the lens holder.

26. The arrangement of claim 25, wherein the means for causing relative motion is a retaining ring having means thereon for imparting translational motion to the lens upon mounting the retaining ring on the lens holder.

27. The arrangement of claim 26, wherein the lens includes peripheral notches adjacent the radial faces, with one of the notches extending from the respective radial face in a direction opposite that the other notches extend, whereby the lens seats with respect to the lens holder for only one angular orientation of the lens with respect to the lens holder.

28. The arrangement of claim 26, wherein the lens includes peripheral notches adjacent the radial faces wherein the peripheral notches are equiangularly spaced with respect to one another.

29. The arrangement of claim 28, wherein the lens holder includes ramps thereon for engaging the notches to initially position the radial faces in proximity with the abutments.

30. The arrangement of claim 29, wherein the means for causing translational motion are spring members extending from the retaining ring.

31. An arrangement for mounting a pair of lenses in a lens holder, each lens having a line of focus passing through a center thereof, and the lens holder having an axis which is an optical axis with which the centers of the lenses align with precision, comprising:
a set of three first abutments on the lens holder, the first abutments being spaced 120° apart with respect to the optical axis;
a set of three second abutments on the lens holder, the second abutments being spaced 120° apart with respect to the optical axis and angularly spaced from the set of three first abutments;
a set of three first notches on the first lens, each notch having a first radial face, with the resulting three first radial faces being spaced 120° from one another with respect to the center of the first lens;
a set of three second notches on the second lens, each notch having a second radial face with the resulting three second faces being spaced 120° from one another with respect to the center of the second lens;
means for initially bringing the first radial faces of the first lens into proximity with the first abutments on the lens holder and for bringing the second radial faces of the second lens into proximity with the second abutments on the lens holder; and
means for causing relative movement between the lenses and the lens holder to bring each radial face into engagement with the abutment with which the radial face is proximate, whereby the centers of the lenses align with the optical axis defined by the lens holder.

32. The arrangement of claim 31, wherein the means for initially bringing the radial faces into proximity with the abutments comprise:
ramp means extending from the lens holder for alignment with the first notches in the first lens, the ramp means bringing the first radial faces into proximity with the first abutments on the lens holder; and
ramp means extending from the first lens for alignment with the second notches in the second lens to bring the second radial faces into proximity with the second abutments on the lens holder.

33. The arrangement of claim 32, wherein the lens holder is a lens barrel with the ramp means thereof disposed therein, the lens barrel receiving the lenses therein.

34. The arrangement of claim 33, wherein the means for causing relative motion is a retaining ring with spring members extending therefrom for engaging the first and second lenses and means thereon for securing the retaining means to the lens barrel.

35. The arrangement of claim 31, wherein the lens holder is a lens barrel which receives the lenses therein, and the means for causing relative motion is a retaining ring securable to the lens barrel.

* * * * *

UNITED STATES PATENT AND TRADEMARK OFFICE
CERTIFICATE OF CORRECTION

PATENT NO. : 5,249,082
DATED : September 28, 1993
INVENTOR(S) : Peter A. Newman

It is certified that error appears in the above-indentified patent and that said Letters Patent is hereby corrected as shown below:

Claim 11, Column 17, line 30, "radially disposed projections each having a firs side" should read --radially disposed projections each having a first side--.

Signed and Sealed this

Second Day of August, 1994

Attest:

BRUCE LEHMAN

Attesting Officer

Commissioner of Patents and Trademarks